(12) United States Patent
Kosugi et al.

(10) Patent No.: US 7,635,054 B2
(45) Date of Patent: Dec. 22, 2009

(54) CLUTCH ACTUATOR, ENGINE UNIT, AND SADDLE TYPE VEHICLE

(75) Inventors: Makoto Kosugi, Iwata (JP); Hisashi Kazuta, Iwata (JP)

(73) Assignee: Yamaha Hatsudoki Kabushiki Kaisha Kabushiki Kaisha Moric, Shizuoka-ken (JP)

( * ) Notice: Subject to any disclaimer, the term of this patent is extended or adjusted under 35 U.S.C. 154(b) by 338 days.

(21) Appl. No.: 11/469,310

(22) Filed: Aug. 31, 2006

(65) Prior Publication Data

US 2007/0240958 A1 Oct. 18, 2007

(30) Foreign Application Priority Data

Apr. 18, 2006 (JP) ............... 2006-114705

(51) Int. Cl.
*F16D 23/12* (2006.01)
(52) U.S. Cl. ............ 192/20; 192/84.6; 192/90; 192/110 B; 74/89.14
(58) Field of Classification Search ........... 192/84.6, 192/90; 74/34, 45, 49, 89.14
See application file for complete search history.

(56) References Cited

U.S. PATENT DOCUMENTS

| | | | |
|---|---|---|---|
| 1,500,878 A | 7/1924 | Kruchten | |
| 4,497,222 A | 2/1985 | Nagaoka et al. | |
| 4,852,419 A * | 8/1989 | Kittel et al. | 74/89.14 |
| 5,078,018 A * | 1/1992 | Saita et al. | 74/89.14 |
| 5,121,649 A | 6/1992 | Randriazanamparany et al. | |
| 6,257,081 B1 | 7/2001 | Gagnon et al. | |
| H2031 H | 6/2002 | Harrell et al. | |
| 6,481,554 B1 | 11/2002 | Ota et al. | |
| 6,502,681 B1 | 1/2003 | Ota et al. | |
| 6,524,224 B2 | 2/2003 | Gagnon et al. | |
| 6,564,663 B2 | 5/2003 | Rioux et al. | |
| 6,931,839 B2 | 8/2005 | Foster | |
| 2004/0118652 A1 | 6/2004 | Muetzel et al. | |
| 2006/0094567 A1 | 5/2006 | Kosugi et al. | |
| 2006/0124422 A1 | 6/2006 | Zenno | |
| 2006/0128525 A1 | 6/2006 | Zenno | |
| 2006/0128527 A1 | 6/2006 | Zenno et al. | |
| 2006/0160660 A1 | 7/2006 | Zenno et al. | |
| 2006/0169561 A1 | 8/2006 | Ooishi et al. | |
| 2006/0169562 A1 | 8/2006 | Kosugi | |
| 2006/0169569 A1 | 8/2006 | Ooishi et al. | |

FOREIGN PATENT DOCUMENTS

DE 433645 A1 4/1995

(Continued)

OTHER PUBLICATIONS

European Search Report; dated Feb. 5, 2007; 4 pages.

(Continued)

*Primary Examiner*—Richard M. Lorence
(74) *Attorney, Agent, or Firm*—Knobbe, Martens, Olson & Bear, LLP

(57) ABSTRACT

A clutch actuator comprises a worm shaft that rotates along with a clutch motor. The worm shaft is meshed with a worm wheel. The worm wheel is fixed to one end of a crank shaft member of a crank shaft separately from a crank arm of the crank shaft. A bearing that supports the crank shaft is provided between the worm wheel and the crank arm.

14 Claims, 17 Drawing Sheets

FOREIGN PATENT DOCUMENTS

| | | |
|---|---|---|
| EP | 0129417 | 6/1984 |
| EP | 0328362 | 8/1989 |
| EP | 0590240 A2 | 4/1994 |
| EP | 0635391 | 7/1994 |
| EP | 0887220 | 12/1998 |
| EP | 0987467 A2 | 3/2000 |
| EP | 1342930 | 9/2003 |
| EP | 1365176 A2 | 11/2003 |
| EP | 1469236 | 4/2004 |
| EP | 1555461 | 7/2005 |
| EP | 1666772 | 6/2006 |
| GB | 2170571 | 8/1986 |
| GB | 2187417 A * | 9/1987 |
| JP | 58152938 | 9/1983 |
| JP | 61024858 | 2/1986 |
| JP | 62017631 | 1/1987 |
| JP | 62110532 | 5/1987 |
| JP | 02118269 | 5/1990 |
| JP | 03172675 | 12/1991 |
| JP | 03290030 | 12/1991 |
| JP | 4266619 | 9/1992 |
| JP | 05026065 | 2/1993 |
| JP | 05039865 | 2/1993 |
| JP | 08061487 | 3/1996 |
| JP | 11082710 | 3/1999 |
| JP | 3044498 | 3/2000 |
| JP | 2000205411 | 7/2000 |
| JP | 2001050389 | 2/2001 |
| JP | 2001146930 | 5/2001 |
| JP | 2001173685 | 6/2001 |
| JP | 2001280493 | 10/2001 |
| JP | 2002067741 | 3/2002 |
| JP | 2002243034 | 8/2002 |
| JP | 2003329064 | 11/2003 |
| JP | 2005282784 | 10/2005 |
| JP | 2006017221 | 1/2006 |
| WO | WO 91/10979 | 7/1991 |
| WO | 9824008 | 6/1998 |
| WO | 0225131 | 3/2002 |
| WO | 2004005743 | 4/2004 |
| WO | 2004094177 | 4/2004 |

OTHER PUBLICATIONS

Co-Pending U.S. Appl. No. 11/514,387, filed Aug. 31, 2006. Title: Clutch Failure Detector, Automatic Clutch System, and Straddle-Type Vehicle.

Co-Pending U.S. Appl. No. 11/514,386, filed Aug. 31, 2006. Title: Clutch Control Device and Vehicle.

Co-Pending U.S. Appl. No. 11/514,000, filed Aug. 31, 2006. Title: Automatic Shift Control Device and Vehicle.

Co-Pending U.S. Appl. No. 11/513,609, filed Aug. 31, 2006. Title: Automated Transmission Controller and Vehicle Including the Automated Transmission Controller.

Co-Pending U.S. Appl. No. 11/514,017, filed Aug. 31, 2006. Title: Automated Transmission Controller and Vehicle Including the Automated Transmission Controller.

Co-Pending U.S. Appl. No. 11/513,537, filed Aug. 31, 2006. Title: Automatic Gearshift Control Device and Vehicle.

Co-Pending U.S. Appl. No. 11/469,268, filed Aug. 31, 2006. Title: Clutch Actuator, Engine Unit, and Straddle Type Vehicle.

Co-Pending U.S. Appl. No. 11/469,228, filed Aug. 31, 2006. Title: Clutch Actuator, Engine Unit, and Straddle Type Vehicle.

Co-Pending U.S. Appl. No. 11/469,252, filed Aug. 31, 2006. Title: Shift Actuator, Vehicle and Method of Integrating Vehicle.

Co-Pending U.S. Appl. No. 10/591,285, filed Aug. 31, 2006. Title: Riding Type Vehicle.

Co-Pending U.S. Appl. No. 10/591,560, filed Aug. 31, 2006. Title: Speed Change Controller for Straddle-Ride Type Vehicles.

Co-Pending U.S. Appl. No. 10/591,559, filed Aug. 31, 2006. Title: Shift Control Device for Straddle-Type Vehicle, and Straddle-Type Vehicle.

Co-Pending U.S. Appl. No. 10/591,284, filed Aug. 31, 2006. Title: Actuation Force Transmission Mechanism and Straddle-Type Vehicle.

* cited by examiner

CLUTCH ACTUATOR, ENGINE UNIT, AND SADDLE TYPE VEHICLE

CROSS-REFERENCE TO RELATED APPLICATIONS

This application claims the priority benefit of Japanese Patent Application No. 2006-114705, which was filed on Apr. 18, 2006 and which is hereby incorporated by reference in its entirety.

BACKGROUND OF THE INVENTION

1. Field of the Invention

The present invention generally relates to a clutch actuator that disengages and engages a clutch. More particularly, the present invention relates to an engine unit that includes such a clutch actuator and a saddle type vehicle, such as a motorcycle, that includes such an engine unit.

2. Description of the Related Art

Conventionally, a system is known that attaches an actuator to a previously existing manual transmission. The actuator is used to automate certain operations such that the system can automate a series of start, stop and shift change operations (clutch disengagement, gear change, and clutch engagement) based on the rider's intention or the state of the vehicle.

Among the actuators used in the above-described system, one example of a clutch actuator for disengaging and engaging the clutch is the clutch actuator disclosed in JP-A-2005-282784. This clutch actuator is provided with a motor, and a worm shaft that rotates coaxially with a motor shaft of the motor. A tip of the worm shaft is formed with a threaded section. In addition, the clutch actuator includes a worm wheel that meshes with the threaded section; a crank shaft that converts rotational motion of the worm wheel to linear reciprocating motion; and an output rod that is connected to the crank shaft. The clutch actuator finally converts the rotational motion of the motor to an axial reciprocating motion of the output rod, and uses the reciprocating motion of the output rod to disengage and engage the clutch. The clutch actuator also includes an assist spring that is connected to a shaft member of the crank shaft (i.e., a shaft member of the worm wheel).

SUMMARY OF THE INVENTION

When the clutch actuator disclosed in JP-A-2005-282784 is viewed from the axial direction of the shaft member of the crank shaft (i.e., the shaft member of the worm wheel), the motor and the output rod are arranged to face in substantially the same direction, which allows the overall size of the structure to be reduced (refer to FIG. 3 of JP-A-2005-282784). However, in order to achieve this arrangement, the space between the worm wheel (namely, a crank arm to which the motor is connected via the worm shaft) and the sub-wheel (namely, a crank arm to which the output rod is connected) has to be increased so that the motor and the output rod do not interfere. Accordingly, a shaft member that connects the worm wheel and the sub-wheel (namely, a crank shaft member that connects the pair of crank arms) has to be made longer.

Therefore, in such a clutch actuator, the shaft member that connects the worm wheel and the sub-wheel is elongated and an assist spring is disposed between the worm wheel and the sub-wheel (refer to FIG. 4 of Patent Document 1). As a result, the shaft member is long and, in order to dispose the assist spring at the shaft member, the shaft member must have a comparatively high strength. Thus, in order to increase rigidity of the clutch actuator, the shaft member is thickened.

However, because the shaft member is thickened, the attachment radius of the output rod (i.e., the distance from the center of the shaft member to the point where the output rod is attached) is enlarged, whereby the actuator becomes bigger. Further, because the attachment radius of the output rod is enlarged, the rotation angle that the crank shaft is required to rotate in order to move the output rod the same stroke is reduced, and thus the rotation angle of the worm wheel is smaller. Accordingly, when the disengagement-engagement operation of the clutch is performed, the necessary motor rotation angle is smaller.

However, when the disengagement-engagement operation of the clutch is performed, in order to accurately control operation of the worm wheel, it is necessary to ensure, to some extent, a large maximum rotation angle of the motor. Thus, a design is sought in which the diameter of the worm wheel is larger, and the reduction ratio between the worm shaft and the worm wheel is larger. However, if the diameter of the worm wheel is made larger, the actuator becomes larger and the weight is also increased. Further, if the reduction gear ratio is enlarged, the operation of the output rod does not rapidly follow the rotation of the motor, and thus the clutch engagement-disengagement operation becomes less responsive.

As a result of the above, the conventional clutch actuator has a larger structure, increased weight, and decreased responsiveness. Further, this type of clutch actuator is less suitable for a saddle type vehicle like a motorcycle.

Thus, one aspect of an embodiment of the invention comprises a clutch actuator, an engine unit including the clutch actuator, and a saddle type vehicle including the engine unit that can limit an increase in structure size and weight while improving the responsiveness of the clutch disengagement-engagement operation.

In one embodiment, the clutch actuator comprises a motor having a motor shaft. A worm shaft is formed with a threaded section and the worm shaft rotates coaxially with the motor shaft. A worm wheel meshes with the threaded section of the worm shaft. A crank shaft has a crank shaft member that rotates along with rotation of the worm wheel and a crank arm provided on the crank shaft member at a distance apart from the worm wheel. An output rod, which is attached to the crank arm, converts rotational motion of the worm wheel, which is transmitted via the crank shaft, to reciprocating motion and disengages and engages a clutch. A first bearing supports the crank shaft member of the crank shaft between the worm wheel and the crank arm.

Because the first bearing is provided between the worm wheel and the crank arm, the crank shaft member of the crank shaft is reliably supported by the first bearing. This support, in part, enables the crank shaft member to be made thinner. Therefore, the attachment radius of the output rod can be decreased. Because the attachment radius of the output rod is smaller, it is possible to increase the rotation angle required of the crank shaft member to move the output rod the same stroke. As a result, the rotation angle of the worm wheel can be increased, thereby allowing the diameter of the worm wheel to be reduced, and the size and weight increase of the actuator can be limited. Further, because the diameter of the worm wheel is smaller, the reduction gear ratio between the worm shaft and the worm wheel can be reduced. Accordingly, the movement of the output rod follows the rotation of the motor rapidly, and the responsiveness of the clutch disengagement-engagement operation can be improved.

One aspect of an embodiment of the present invention involves a clutch actuator that comprises a motor. The motor comprises a motor shaft. The motor shaft is rotatable about a first axis. A worm shaft comprises a threaded section. The worm shaft is rotatable about a second axis. The first axis is coaxial to the second axis. A worm wheel meshes with the threaded section of the worm shaft. A crank shaft comprises a crank shaft member that rotates with rotation of the worm wheel. The crank shaft also comprises a crank arm that is provided on the crank shaft member at a distance apart from the worm wheel. An output rod is attached to the crank arm. The output rod is adapted to convert rotational motion of the worm wheel transmitted via the crank shaft to reciprocating motion. The output rod further is adapted to disengage and engage a clutch. A first bearing supports the crank shaft member of the crank shaft and is positioned between the worm wheel and the crank arm.

BRIEF DESCRIPTION OF THE DRAWINGS

These and other features, aspects and advantages will now be described with reference to drawings of a preferred embodiment. The drawings comprise the following figures.

DETAILED DESCRIPTION OF THE PREFERRED EMBODIMENT

Figure 1:
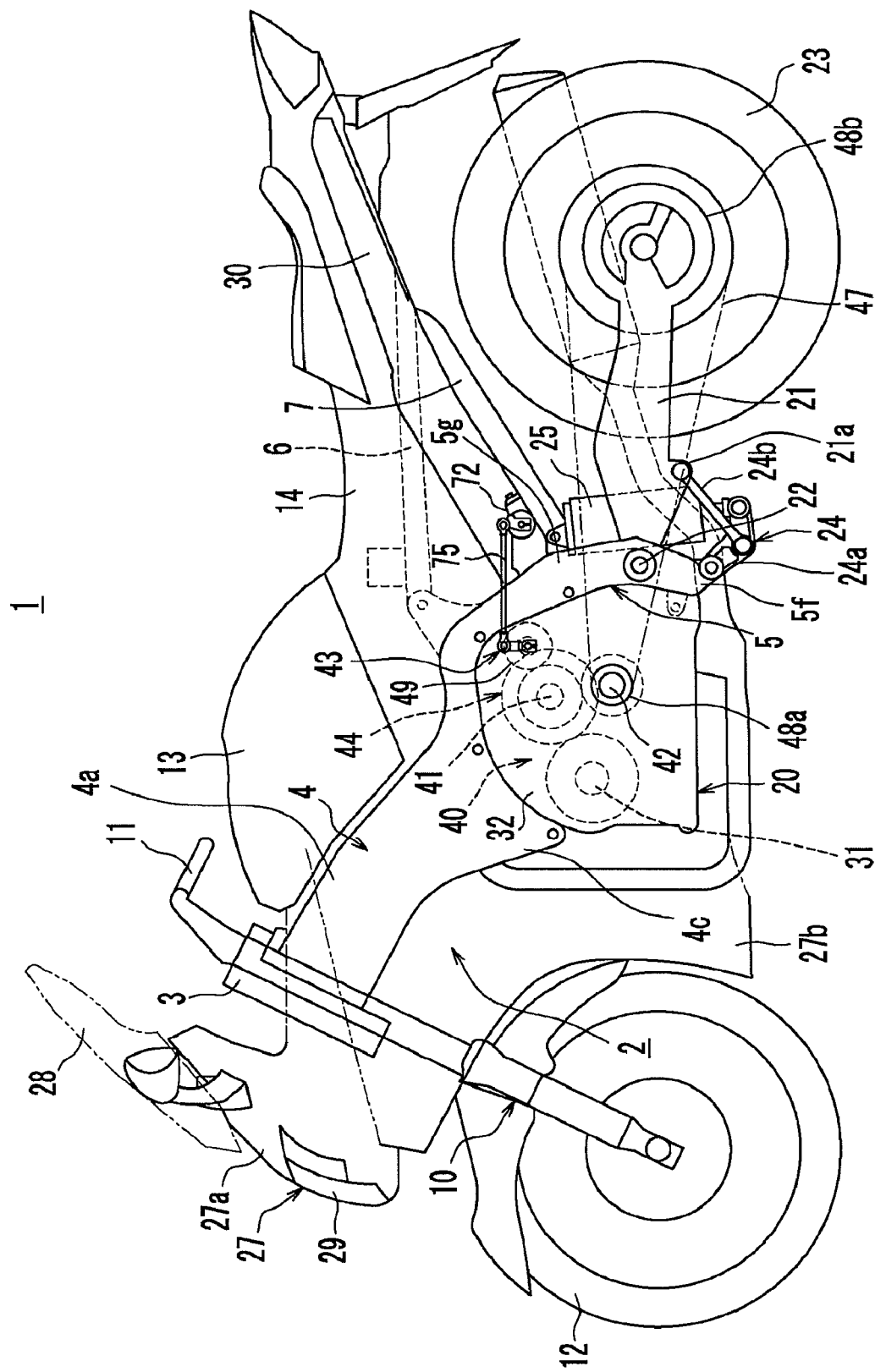
FIG. 1 is a side view of a motorcycle that is arranged and configured in accordance with certain features, aspects and advantages of an embodiment of the invention.

FIG. 1 is a side view of a motorcycle 1 that is arranged and configured in accordance with certain features, aspects and advantages of an embodiment of the present invention. As can be seen from FIG. 1, the motorcycle 1 comprises a head tube 3 and a body frame 2. The body frame 2 comprises a main frame 4 that extends rearward from the head tube 3 and a rear arm bracket 5 that extends downward from a rear section of the main frame 4. The main frame 4 has two frame sections 4a that extend to the left and right in a rearward direction from the head tube 3 (only one of these is shown in FIG. 1). A rear section of the frame section 4a is connected to the downwardly-extending rear arm bracket 5.

A front fork 10 is pivotably supported by the head tube 3. A steering handlebar 11 is provided at an upper end of the front fork 10 and a front wheel 12 is provided at a lower end of the front fork 10. In the illustrated configuration, a fuel tank 13 is provided in an upper section of the main frame 4 and a seat 14 is provided to the rear of the fuel tank 13. The seat 14 is mounted on a seat rail 6 that extends rearward from the main frame 4.

In one configuration, an engine 20 is suspended from the main frame 4 and the rear arm bracket 5. The engine 20 is supported by an engine attachment section 4c and the frame section 4a of the main frame 4, and is also supported by an engine attachment section (not shown) of the rear arm bracket 5. Note that, the engine 20 is not limited to being an internal combustion engine like a gasoline engine, and may be an electric motor, or any other suitable vehicle powering construction. Further, the engine may combine a gasoline engine and an electric motor such as in a hybrid vehicle, for instance.

A front end of a rear arm 21 is supported via a pivot shaft 22 in the rear arm bracket 5 so as to be capable of rocking upward and downward. A rear wheel 23 is supported by a rear end of the rear arm 21. The rear arm 21 is supported by the body frame 2 via a link mechanism 24 and a rear cushion unit 25. The illustrated link mechanism 24 has a body side link 24a and a rear arm side link 24b. One end of the body side link 24a is rotatably coupled to a link attachment section 5f of the rear arm bracket 5. One end of the rear arm side link 24b is rotatably coupled to a link attachment section 21a of the rear arm 21. In addition, a central section of the body side link 24a and the other end of the rear arm side link 24b are rotatably coupled. A lower section of the rear cushion unit 25 is supported by the other end of the body side link 24a, and an upper section of the rear cushion unit 25 is supported by a cushion attachment section 5g. The rear cushion unit 25 is disposed to the rear of the rear arm bracket 5.

Further, a cowling 27 can be provided on the body frame 2. The cowling 27 preferably comprises an upper cowling 27a that covers an area forward of the steering handlebar 11, and a lower cowling 27b that covers forward and to the left and right sides of the main frame 4 and to the left and right sides below the engine 20. The upper cowling 27a can be supported by the main frame 2 via a stay (not shown). The upper cowling 27a preferably defines a front surface and both side surfaces in the left and right directions of a body front section. Further, a screen 28 and a head lamp 29, both of which can made from a transparent material or the like, can be attached to the upper cowling 27a and can be positioned at an upper section of the body front. A side cover 30 preferably is disposed on a back stay 7 to cover the region above the rear wheel 23 and to the left and right side of the seat 14.

Although the type of engine used in the invention is not limited, the engine 20 in the illustrated configuration is a liquid cooled, parallel 4-cycle, 4-cylinder engine. The engine 20 preferably is disposed such that the cylinder axis (not shown) lies in the body forward direction and is slightly inclined from horizontal. A crank case 32 that houses a crank shaft 31 can be suspended from and supported by the body frame 2 at both sides in the vehicle width direction.

As illustrated, the engine 20 preferably is provided with a transmission 40. The transmission 40 can comprise a main shaft 41 that is positioned generally parallel to the crank shaft

31; a drive shaft 42 that is positioned generally parallel to the main shaft 41; and a shift mechanism 43 that comprises multi-speed gears 49. Preferably, the transmission 40 is integrally assembled with the crank case 32. The clutch mechanism 44 can disengage and reengage the transmission to the engine when the gears 49 are switched.

The drive shaft 42 can be provided with a drive sprocket 48a and a chain 47 can be wound around this drive sprocket 48a and a driven sprocket 48b provided on the rear wheel 23. Accordingly, engine power is transmitted to the rear wheel 23 via the chain 47. Other configurations, such as a shaft drive or a belt drive, for example but without limitation, also can be used.

The motorcycle 1 preferably comprises an automated transmission control device 50. FIG. 2 through FIG. 6 show one configuration of the automated transmission control device 50. As is apparent from FIG. 2, the automated transmission control device 50 preferably automatically disengages and engages the clutch mechanism 44 and switches the gears of the transmission 40. The automated transmission control device 50 can comprise a clutch actuator 60 that drives the clutch mechanism 44; a shift actuator 70 that switches the gears of the transmission 40; and an engine control device 95 (see FIG. 8) that, in one configuration, controls operation of the clutch actuator 60 and the shift actuator 70.

Figure 3:
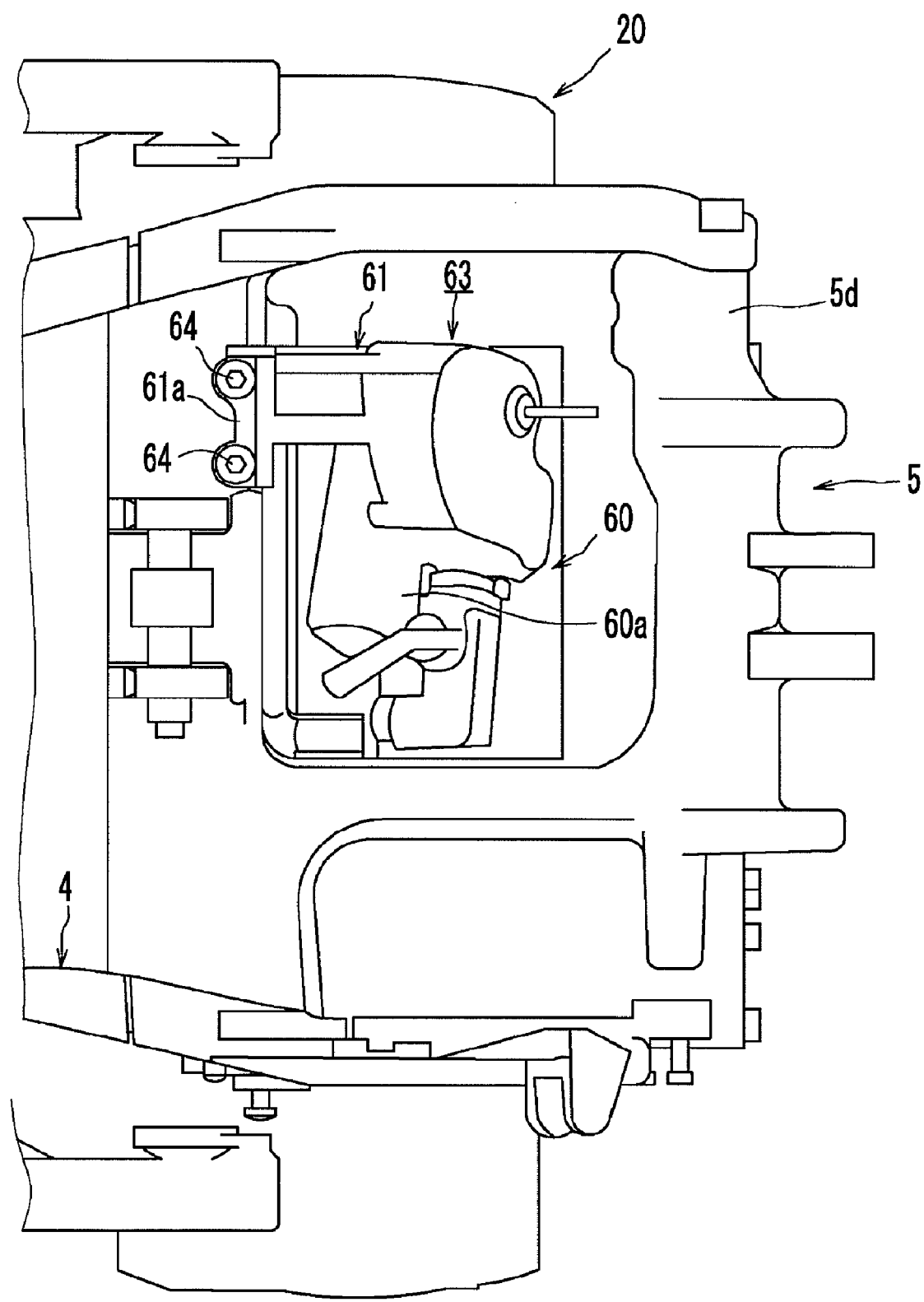
FIG. 3 is another view of the automated transmission control device shown in FIG. 2.
Figure 4:
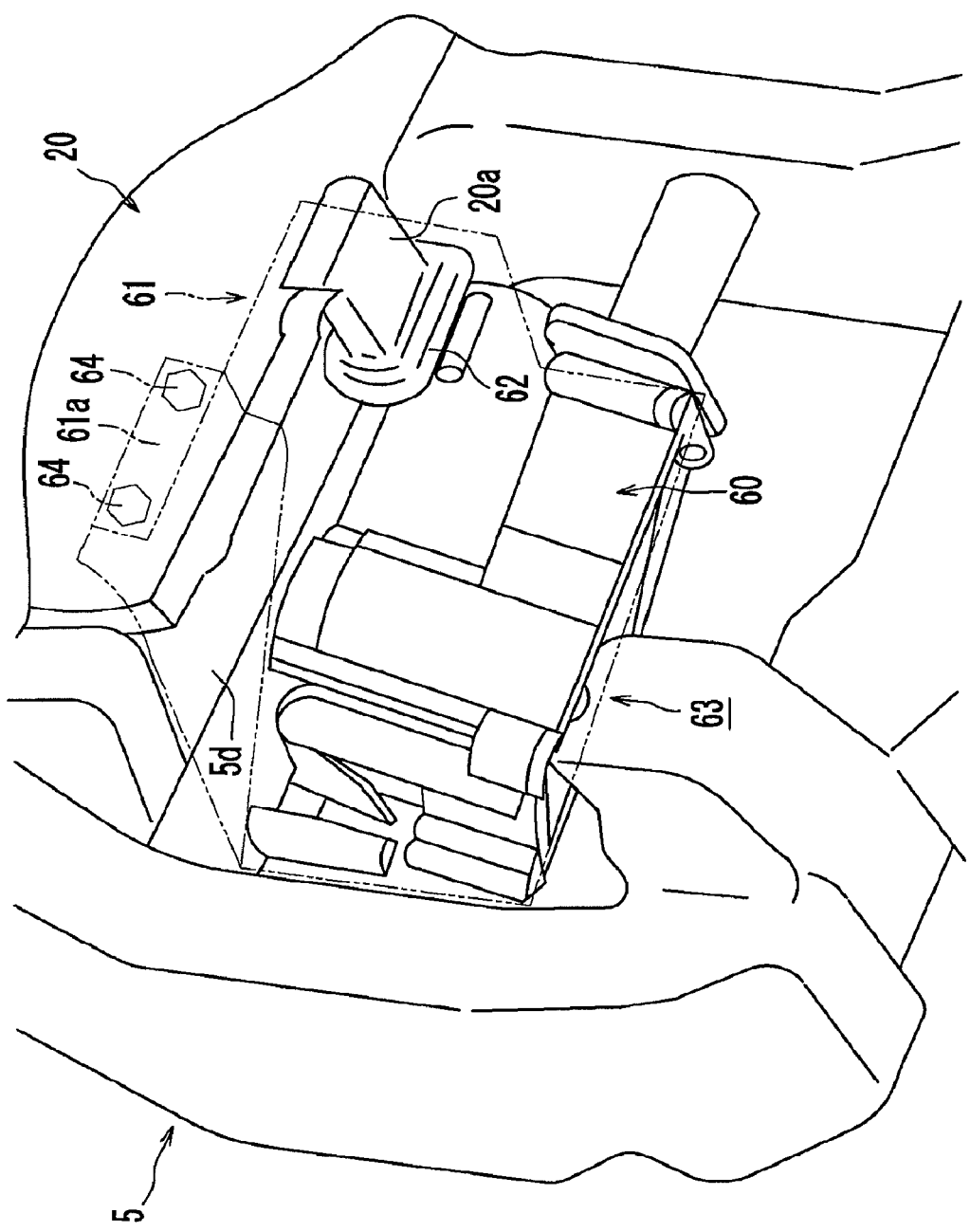
FIG. 4 is a perspective view of the automated transmission control device.
Figure 5:
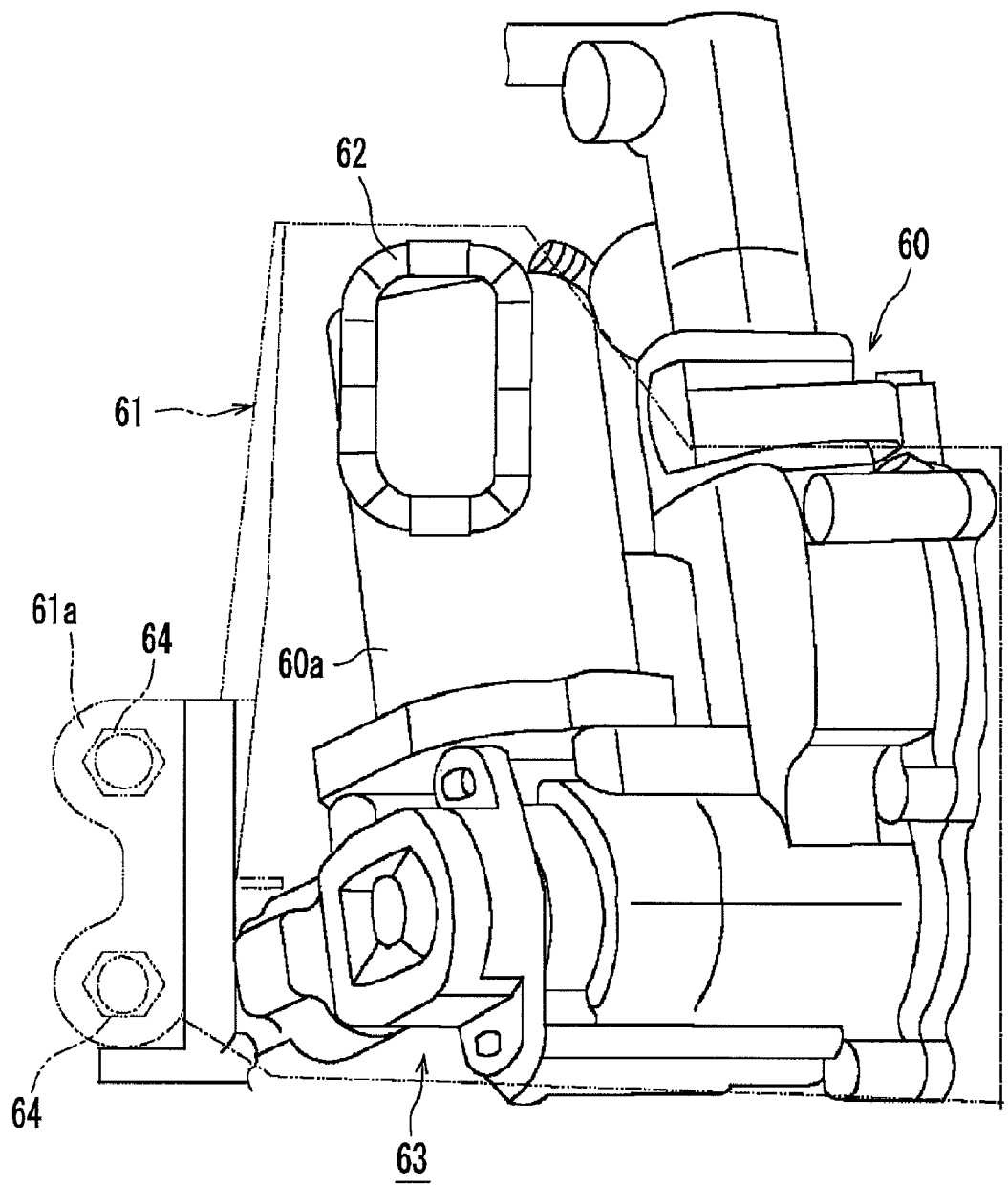
FIG. 5 is a further perspective view of the automated transmission control device.

Referring to FIG. 3, the clutch actuator 60 is formed from a clutch control unit 63 that can be integrally assembled with an attachment plate 61 on which various structural members are mounted. An engagement hole 62 (refer to FIG. 4 and FIG. 5) preferably is secured to the attachment plate 61. As shown in FIG. 4, the clutch control unit 63 is attached such that the engagement hole 62 is engaged with a protrusion 20a that is fixed to a rear section of the engine 20, and an attachment section 61a of the attachment plate 61 is secured to a member 5d of the rear arm bracket 5 using fasteners 64, such as bolts or the like. Other manners of securing the clutch control unit also can be used. In the illustrated configuration, the clutch control unit 63 is arranged and positioned to the rear of the engine 20 and is surrounded by the rear arm bracket 5 when viewed from the side (refer to FIG. 1).

Figure 2:
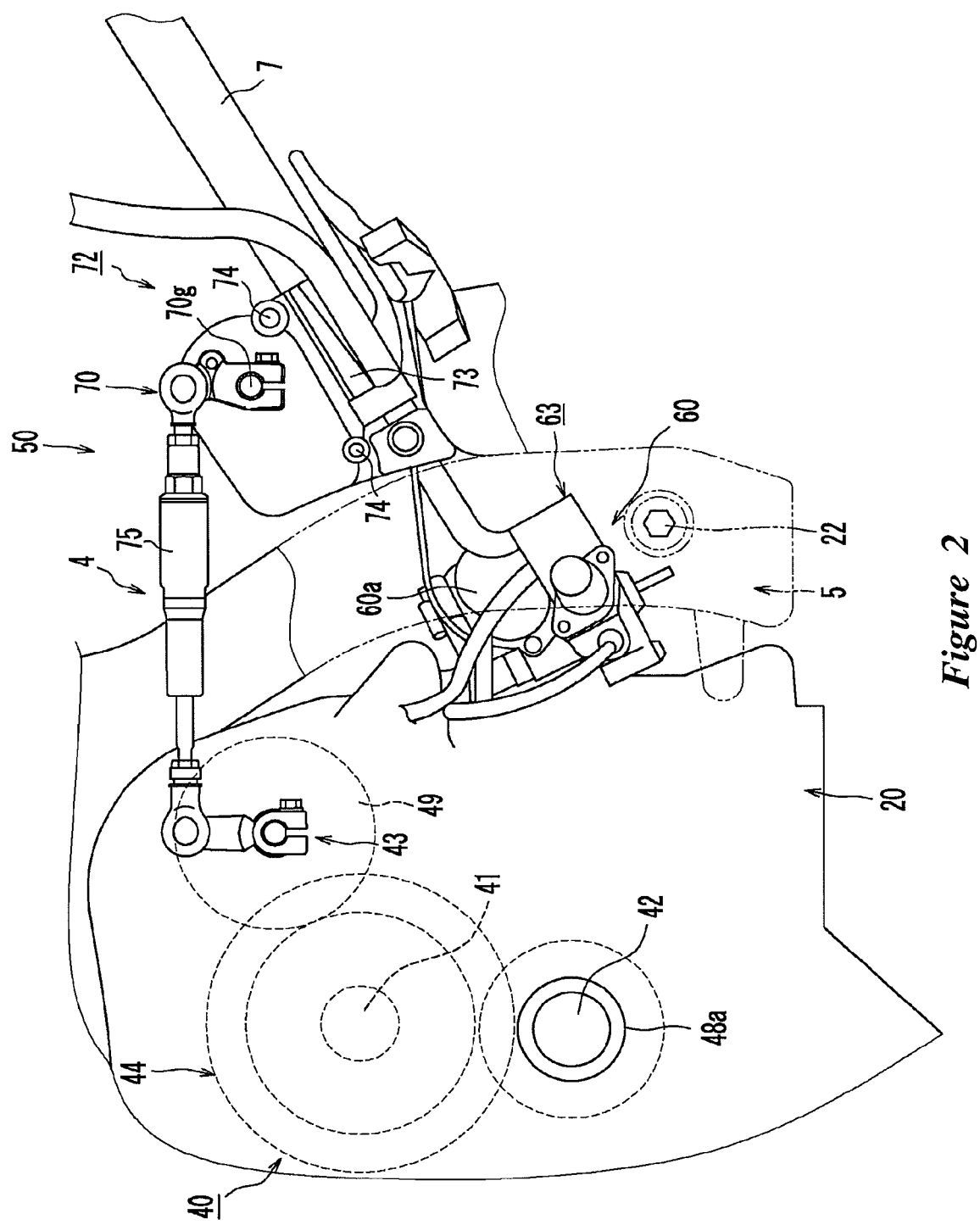
FIG. 2 is an enlarged side view of an automated transmission control device used on the motorcycle of FIG. 1.
Figure 6:
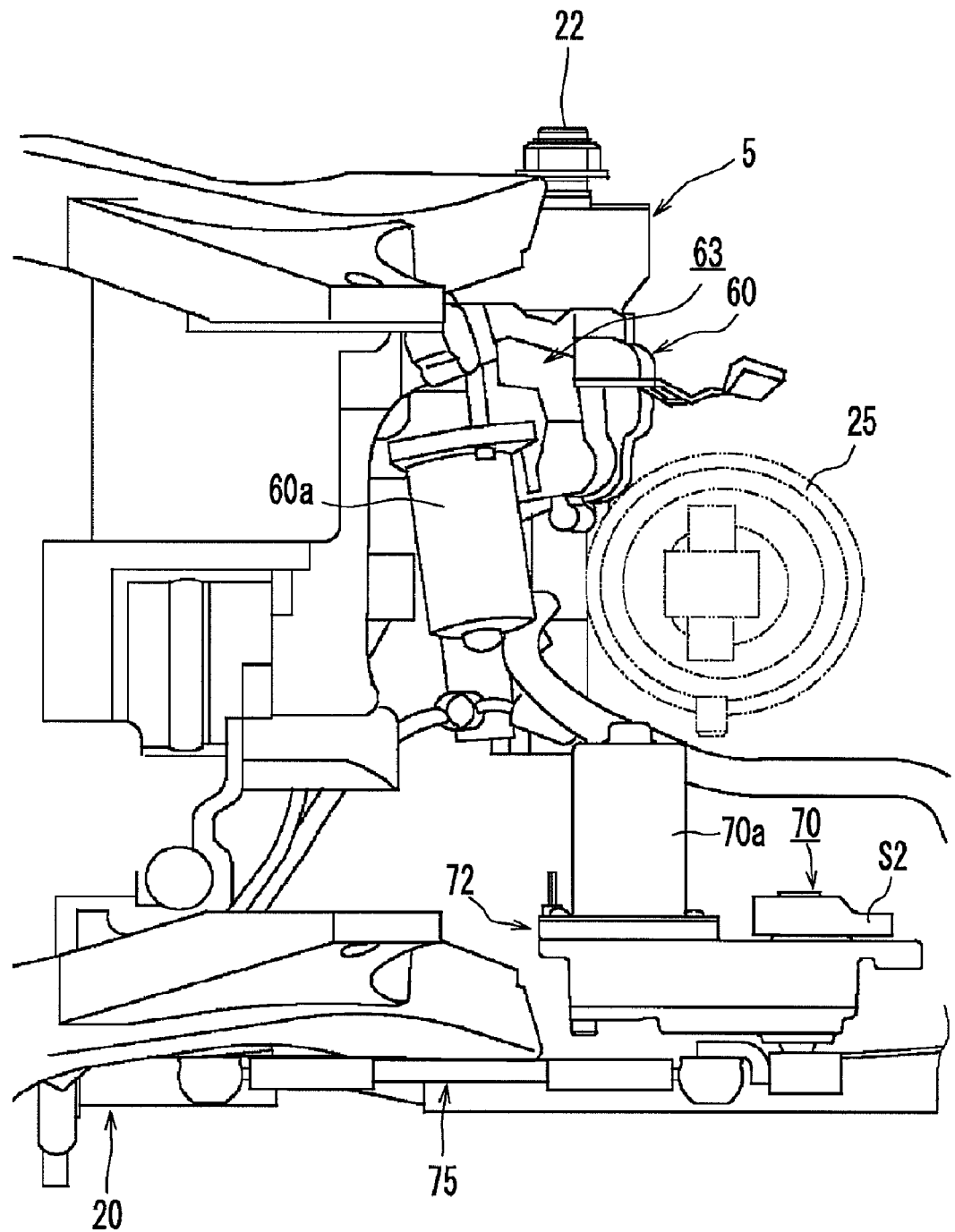
FIG. 6 is a top plant view of the automated transmission control device.

Referring to FIG. 2 and FIG. 6, the shift actuator 70 preferably is integrated with a shift position detection sensor S2 (refer to FIG. 6), and these members can define a shift control unit 72. As can be seen from FIG. 2, an attachment bracket 73 is fixed to the back stay 7. In one configuration, the shift control unit 72 is attached by securing the shift actuator 70 to the attachment bracket 73 using fasteners 74, which can be bolts or the like. In this manner, the shift control unit 72 is arranged and positioned such that, when viewed from the side, the shift control unit 72 is opposite from the transmission 40 with the main frame 4 interposed therebetween while the shift actuator 70 is positioned to the rear of the main frame 4.

The shift mechanism 43 and the shift actuator 70 can be coupled together by a shift power transmission member. In this embodiment, the shift power transmission member comprises a shift rod 75. The shift rod 75, when viewed from the side, preferably extends across the body frame 2.

Figure 7:
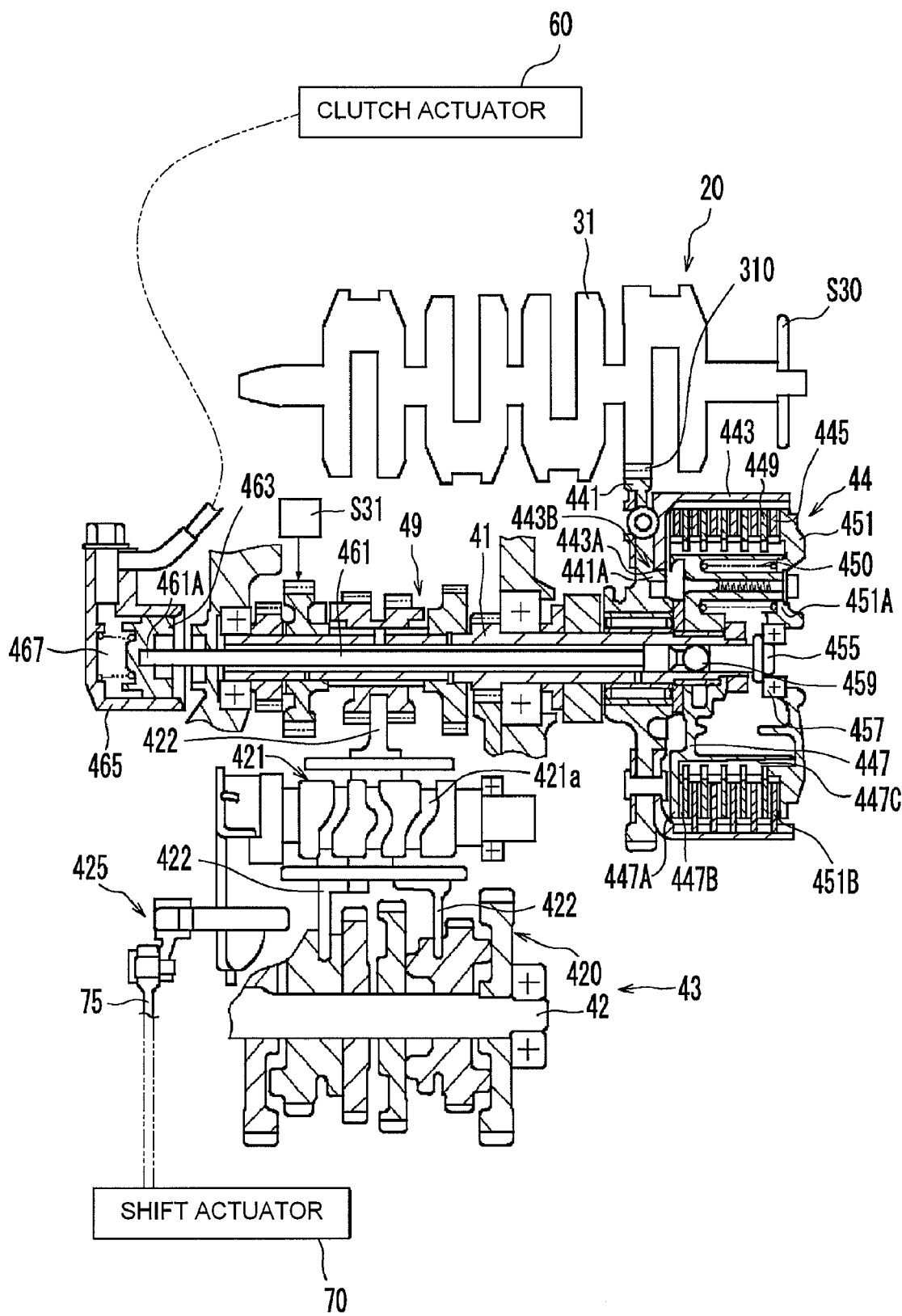
FIG. 7 is sectioned view of the internal structure of an engine unit and some portions of the automated transmission control device.

With reference now to FIG. 7, the clutch mechanism 44 in the illustrated embodiment comprises, for example, a multi-plate friction clutch, and includes a clutch housing 443; a plurality of friction plates 445 provided integrally with the clutch housing 443; a clutch boss 447; and a plurality of clutch plates 449 provided integrally with the clutch boss 447. A gear 310 is integrally supported by the crank shaft 31 of the engine 20, and the main shaft 41 supports a gear 441 that meshes with the gear 310 such that the gear 441 can rotate with respect to the main shaft 41. The clutch housing 443 is integrally provided with the gear 441, and torque from the crank shaft 31 is transmitted to the clutch housing 443 through the gear 441. Torque from the clutch housing 443 is transmitted to the clutch boss 447 by frictional force generated between the plurality of friction plates 445 and the plurality of clutch plates 449.

The gear 441 can be rotatably supported by the main shaft 41 at one end section (the right side in FIG. 7) of the main shaft 41. The clutch housing 443 preferably is integrated with a boss section of the gear 441, thus allowing rotation with respect to the main shaft 41 while controlling movement in the axial direction of the main shaft 41. Further, the clutch boss 447 can be integrated with the main shaft 41 at the side of the one end section of the main shaft 41 (further to the end of the one end section than the gear 441).

The clutch boss 447 is provided inward of the tubular clutch housing 443. The gear 441, the clutch housing 443, the clutch boss 447, and the main shaft 41 preferably are coaxial with their centers of rotation aligned.

The boss section of the gear 441 is provided with a tubular or cylindrical engagement protrusion 441A. An engagement member 443B, formed with an engagement hole 443A that engages with the engagement protrusion 441A, can be provided at one end section (on the left side of FIG. 7) of the tubular clutch housing 443. The engagement protrusion 441A preferably is received by the engagement hole 443A to secure the clutch housing 443 to the gear 441.

Each friction plate 445 is a thin ring shaped plate. The external peripheral edge of each friction plate 445 is supported at an inside surface of a tubular section of the clutch housing 443 such that the plate surface of each friction plate 445 is substantially perpendicular with respect to the axial direction of the main shaft 41. As a result of this support, each friction plate 445 can be capable of very slight relative movement relative to the clutch housing 443 in the axial direction of the main shaft 41. Further, each friction plate 445 is controlled such that it is not capable of relative rotation in the rotational direction of the main shaft 41 with respect to the clutch housing 443. In some configurations, the friction plates 445 are secured to the clutch housing 443 with splines, which secure the friction plates 445 to rotate with the clutch housing 443 while allowing the friction plates to move in the axial direction.

Note that, there is a predetermined space (with a length that is very slightly larger than the thickness of the clutch plate 449) between each of the above described plate surfaces of the friction plates 445.

The clutch boss 447 is tubular, and a circular flange 447A, which has an external diameter that is substantially the same as the external diameter of the clutch plate 449, is provided at one end section of the clutch boss 447 (the left side in FIG. 7). The plurality of clutch plates 449 are supported at the external periphery of the tubular section of the clutch boss 447. As a result of this support, each clutch plate 449 is capable of very slight relative movement in the axial direction of the main shaft 41 with respect to the clutch boss 447. Further, each clutch plate 449 is controlled such that it is not capable of relative rotation in the rotational direction of the main shaft 41 with respect to the clutch boss 447.

Moreover, the clutch boss 447 is fixed to the one end section side of the main shaft 41 (e.g., the right side in FIG. 7) such that the flange 447A is positioned at the engagement member 443B of the clutch housing 443.

Each clutch plate 449 is a thin ring shaped plate. The internal peripheral edge of each clutch plate 449 is supported at the outer surface of the tubular section of the clutch boss 447 such that the plate surface of each clutch plate 449 is substantially perpendicular with respect to the axial direction of the main shaft 41.

Further, there is a predetermined space (with a length that is very slightly larger than the thickness of the friction plate 445) between each of the above described plate surfaces of the clutch plates 449.

The external diameter of each clutch plate 449 is slightly smaller than the internal diameter of the tubular section of the clutch housing 443. The internal diameter of each friction plate 445 is slightly larger than the external diameter of the tubular section of the clutch boss 447. In addition, the friction plates 445 and the clutch plates 449 are alternately arranged in the axial direction of the main shaft 41, and a very slight space is formed between each of the friction plates 445 and the clutch plates 449 in the axial direction of the main shaft 41.

A pressing member 447B, structured by the flange 447A of the clutch boss 447, is provided at the engagement member 443B side (the left side in FIG. 7) of the clutch housing 443 at the external side in the axial direction of the main shaft 41 of the alternately arranged friction plates 445 and the clutch plates 449. The pressing member 447B and a pressure plate 451 squeezes the interposed friction plates 445 and the clutch plates 449 in the axial direction of the main shaft 41, thus generating frictional force between each friction plate 445 and each clutch plate 449.

A plurality of cylindrical guide members 447C, which extend in the axial direction of the main shaft 41 and which are provided integrally with the clutch boss 447, are provided at the internal side of the tubular clutch boss 447. The pressure plate 451 is provided with a plurality of guides 451A that respectively engage with the guides 447C. As a result of the guides 447C and the guides 451A, the pressure plate 451 is capable of relative movement in the axial direction of the main shaft 41 with respect to the clutch boss 447, and also rotates generally synchronously with the clutch boss 447. Note that, the pressure plate 451 is driven by the clutch actuator 60. The clutch actuator 60 will be described in detail later with reference to the drawings.

Further, the pressure plate 451 has a generally flat pressing member 451B. This pressing member 451B is substantially parallel to the plate surface of each friction plate 445 and each clutch plate 449.

The clutch mechanism 44 is provided with a plurality of springs 450 that are disposed so as to respectively surround each of the plurality of tubular guides 447C. Each spring 450 urges the pressure plate 451 toward the left side of FIG. 7. In other words, each spring 450 urges the pressure plate 451 in the direction in which the pressing member 451B of the pressure plate 451 is moved close to the pressing member 447B of the clutch boss 447.

The pressure plate 451 is engaged at a central section of the pressure plate 451 with one end (the right side of FIG. 7) of a push rod 455 via a bearing like a deep groove ball bearing 457 such that the pressure plate 451 is capable of rotating with respect to the push rod 455. The other end of the push rod 455 (the left side of FIG. 7) is engaged with the internal side of one end section of the tubular main shaft 41. A spherical ball 459 that abuts with the end of the push rod 455 (e.g., the left end in FIG. 7) is provided inside of the tubular main shaft 41. Further, a push rod 461 that abuts with the ball 459 is provided at the right side of the ball 459.

An end section 461A (e.g., left end section in FIG. 7) of the push rod 461 protrudes outward beyond the other end (e.g., the left end in FIG. 7) of the tubular main shaft 41. A piston 463 can be integrated with the end section 461A. The piston 463 can be guided by a cylinder body 465, and can slide in the axial direction of the main shaft 41.

When hydraulic oil, which acts as a compressed fluid, is supplied to a space 467 enclosed by the piston 463 and the cylinder body 465, the piston 463 is pushed and moved in the rightward direction in FIG. 7. Accordingly, the piston 463 pushes the pressure plate 451 in the rightward direction of FIG. 7 via the push rod 461, the ball 459, the push rod 455, and the deep groove ball bearing 457. In this way, the pressure plate 451 is pushed in the rightward direction of FIG. 7, and the pressing member 451B of the pressure plate 451 separates from the friction plates 445, thereby disengaging the clutch.

When the clutch mechanism 44 is to be connected (i.e., engaged), the pressure plate 451 is urged and moves in the direction of the flange 447A of the clutch boss 447 (e.g., the leftward direction of FIG. 7) by the springs 450. In this state, the pressing member 447B of the clutch boss 447 and the pressing member 451B of the pressure plate 451 cause frictional force to be generated between each friction plate 445 and each clutch plate 449. Accordingly, driving force can be transmitted from the clutch housing 443 to the clutch boss 447.

On the other hand, when the clutch mechanism 44 is to be disengaged, the push rod 455 moves the pressure plate 451 in the rightward direction in FIG. 7. Further, the pressing member 451B of the pressure plate 451 is separated from the friction plate 445 positioned closest to the pressing member 451B (e.g., the friction plate 445 on the far right side of FIG. 7).

In this state, each friction plate 445 and each clutch plate 449 are not in contact, and thus a very slight space is formed between each friction plate 445 and each clutch plate 449. Accordingly, frictional force, which enables the transmission of driving force, is not generated between the friction plates 445 and the clutch plates 449.

In this manner, depending on the magnitude of the driving force of the clutch actuator 60 and the urging force of the springs 450, the pressure plate 451 is moved in one or the other of the axial directions of the main shaft 41. The clutch is engaged or disengaged in accordance with this movement.

With continued reference to FIG. 7, an engine rotation speed sensor S30 can be mounted to the end of the crank shaft 31 of the engine 20. The crank shaft 31 can be coupled to the main shaft 41 via the multi-plate clutch mechanism 44. The multi-speed gears 49 are mounted to the main shaft 41, and a main shaft rotation speed sensor S31 is also provided on the main shaft 41. Each gear 49 on the main shaft 41 preferably meshes with a respective gear 420 mounted on the drive shaft 42 that corresponds with each gear 49. For clarity, FIG. 7 shows the drive shaft 42 and the main shaft 41 separated from each other with no contact at the gears; it should be understood that these shafts, and in particular the gears on the shafts, are connected together. The main shaft gears 49 and the drive shaft gears 420 are attached such that, apart from the selected pair of gears, either one or both of the gears 49 and gears 420 can rotate freely (in an idle state) with respect to either the main shaft 41 or the drive shaft 42. Accordingly, transmission of rotation from the main shaft 41 to the drive shaft 42 only occurs via the selected pair of gears.

The operation of selecting and changing the gear ratio of the gears 49 and the gears 420 is performed by a shift cam 421 that is mounted to, or defines a portion of, a shift input shaft. The shift cam 421 preferably has a plurality of cam grooves 421a. A shift fork 422 is mounted in each cam groove 421a. Each shift fork 422 engages with a dog assigned to each predetermined main shaft gear 49 and/or a predetermined drive shaft gear 420 on the respective main shaft 41 and drive shaft 42. The dogs couple the gears to the shafts for rotation and are slideable along the shafts. Rotation of the shift cam 421 causes the shift fork 422 to move in an axial direction while being guided by the cam groove 421a, whereby only the pair of the main shaft gear 49 and the drive shaft gear 420 at the position corresponding to the rotation angle of the shift cam 421 are spline fixed to the respective main shaft 41 and the drive shaft 42. Accordingly, the gear position is determined, and rotation is transmitted at a predetermined gear ratio between the main shaft 41 and the drive shaft 42, via the main shaft gear 49 and the drive shaft 420.

The shift mechanism 43 uses movement of the shift actuator 70 to reciprocally move the shift rod 75, whereby the shift cam 421 is rotated by just a predetermined angle via a shift link mechanism 425. Accordingly, the shift fork 422 moves just a predetermined amount in the axial direction along the cam groove 421a. The gear pairs are thus fixed in order to the main shaft 41 and the drive shaft 42, whereby rotational driving force is transmitted at each reduction gear ratio.

Figure 8:
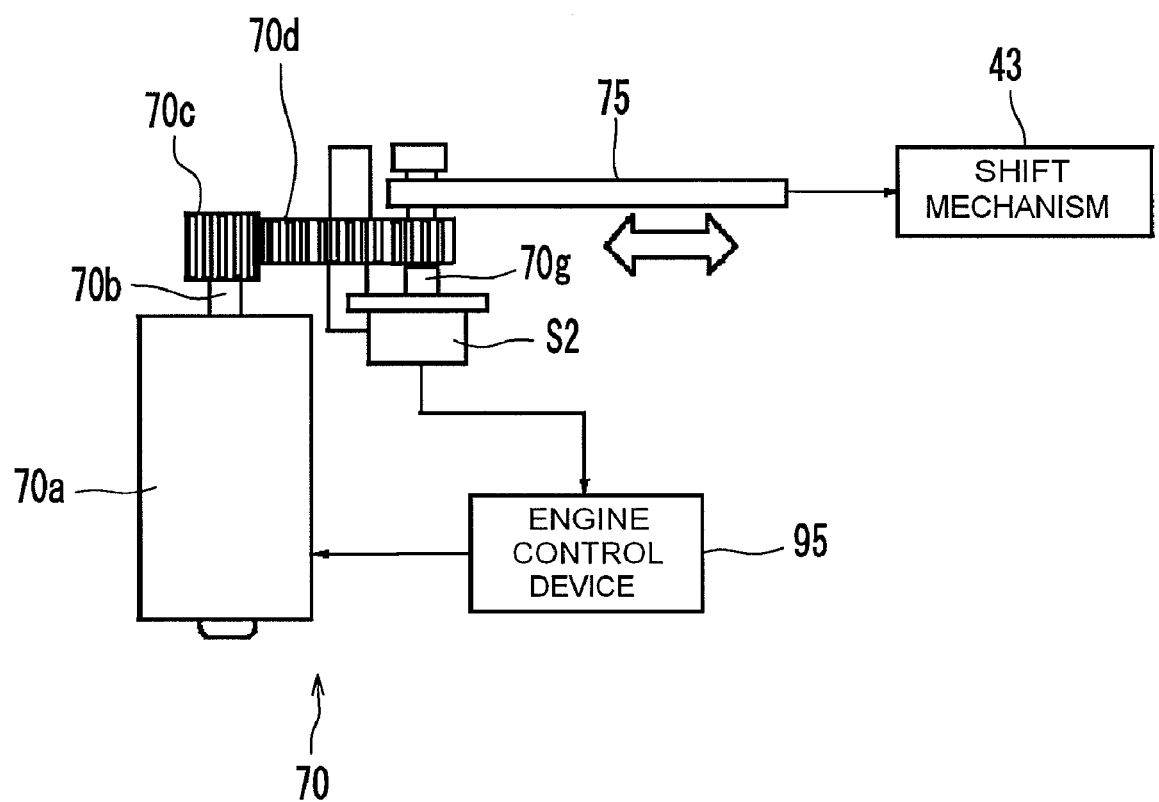
FIG. 8 is a schematic view of a shift actuator, a shift rod, and a shift mechanism of the automated transmission control device.

The shift actuator 70 may be hydraulic or electric. FIG. 8 is an outline view of one embodiment of the shift actuator 70, the shift rod 75, and the shift mechanism 43. Referring to FIG. 8, in the shift actuator 70 according to the embodiment, a shift motor 70a rotates when a signal is output from the engine control device 95. The rotation of the shift motor 70a causes a gear 70c of a motor shaft 70b to rotate. The rotation of the gear 70c causes a coupled reduction gear 70d to rotate, whereby a drive shaft 70g rotates.

Figure 9:
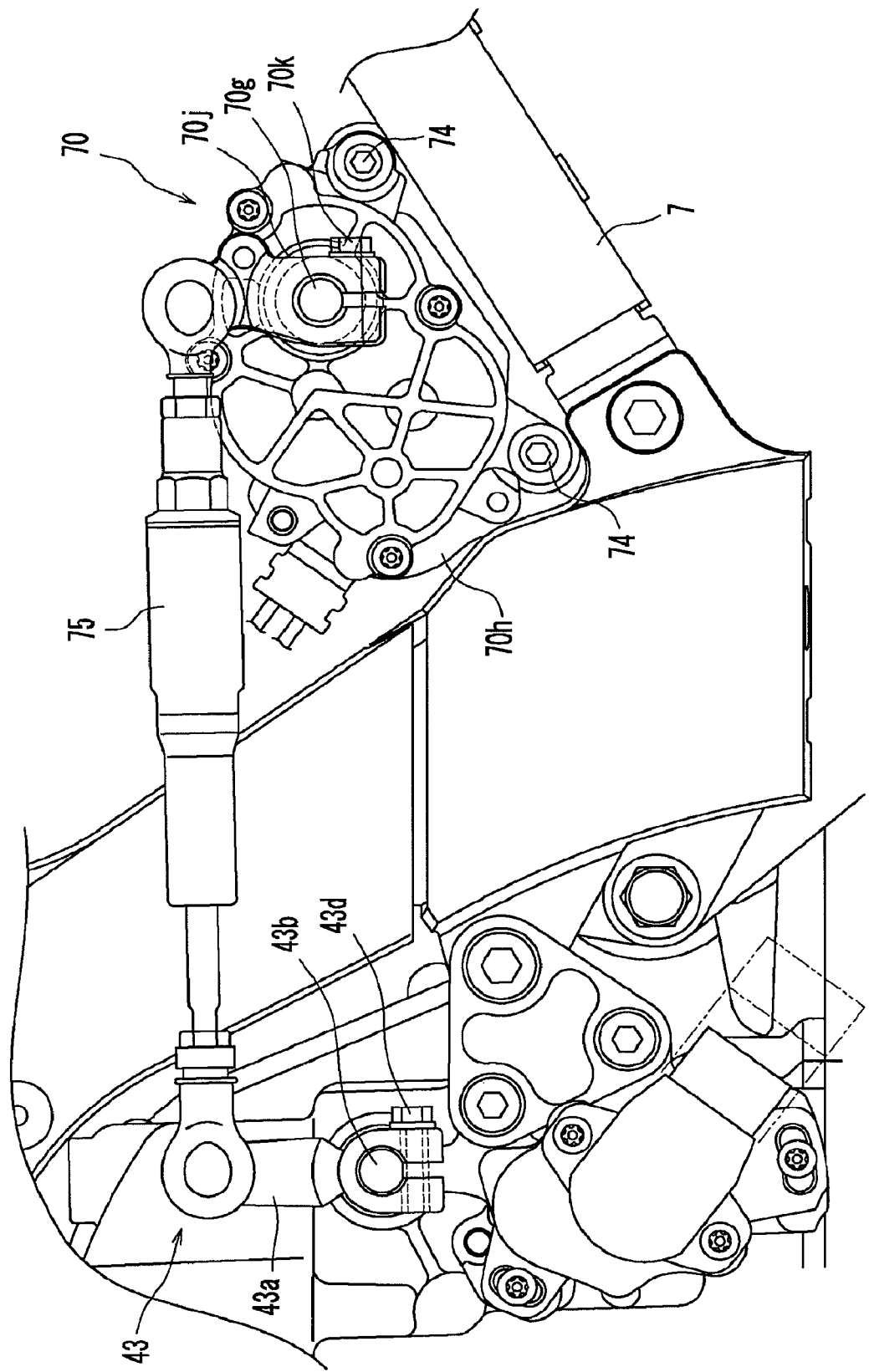
FIG. 9 is a side view of the shift actuator, the shift rod, and the shift mechanism.

FIG. 9 shows a side view of the shift actuator 70, the shift rod 75, and the shift mechanism 43. Referring to FIG. 9, a housing 70h of the shift actuator 70 is fixed to the attachment bracket 73 fixed to the back stay 7 (refer to FIG. 2) using a fastener 74 (refer to FIG. 2). Any other mounting configuration also can be used.

An operation lever 70j is provided on the drive shaft 70g (refer to FIG. 8). A connecting section of the shift rod 75 on the shift actuator 70 side is connected using a bolt (not shown) to the operation level 70j. Other connecting constructions also can be used. The connecting section of the shift rod 75 on the shift actuator 70 side is capable of rotating with respect to the operation lever 70j. Further, the operation lever 70j is fastened and fixed to the drive shaft 70g by a bolt 70k, whereby the operation lever 70j is generally prevented from moving in the axial direction of the drive shaft 70g.

The shift position detection sensor S2 preferably is disposed on the drive shaft 70g (refer to FIG. 8). This shift position detection sensor S2 can be disposed at an end (e.g., the end toward the inward direction of the paper of FIG. 9) of the drive shaft 70g, and can be secured to the housing 70h by an attachment bolt (not shown) or in any other suitable manner. The shift position detection sensor S2 advantageously detects position information based on the rotation of the drive shaft 70g, and transmits this position information to the engine control device 95. The engine control device 95 can control the shift motor 70a based on the position information.

Moreover, a connecting section of the shift rod 75 at the shift mechanism 43 side can be connected to a shift operation lever 43a of the shift mechanism 43 by a bolt (not shown). The connecting section of the shift rod 75 at the shift mechanism 43 side preferably is capable of rotating with respect to the shift operation lever 43a. Further, the shift operation lever 43a can be secured to a shift operation shaft 43b by a bolt 43d or in any other suitable manner, whereby the shift operation lever 43a is generally prevented from moving in the axial direction of the shift operation shaft 43b.

When the shift rod 75 moves, the shift operation lever 43a also moves. The movement of the shift operation lever 43a is a rotational motion centering on the shift operation shaft 43b that is spline engaged with the shift operation lever 43a. Thus, the shift operation shaft 43b rotates along with the movement of the shift operation lever 43a. Preferably, the dimensions of the linkages are chosen such that the relative angular movements are sufficient to generate the resultant gear changes desired.

Figure 10:
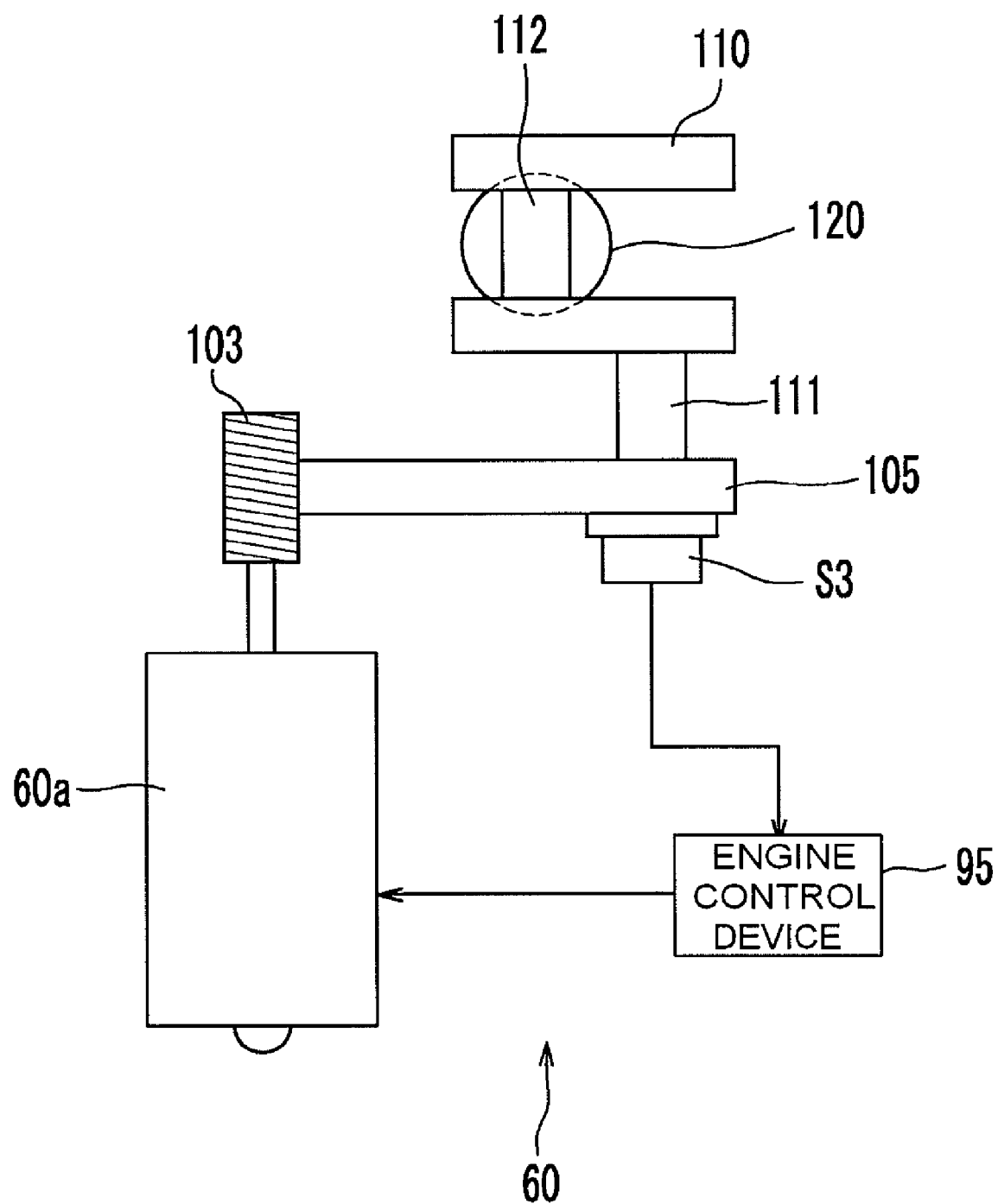
FIG. 10 is a schematic view of a clutch actuator.

Next, the structure of the clutch actuator 60 will be explained in even more detail. FIG. 10 shows an outline view of the clutch actuator 60. Referring to FIG. 10, in the clutch actuator 60 according to the embodiment, a clutch motor 60a rotates when a signal is output by the engine control unit 95, and this rotation causes rotation of a worm shaft 103. Rotation of the worm shaft 103 is transmitted to a worm wheel 105 that is meshed with the worm shaft 103. The worm wheel 105 is fixed to a crank shaft 110 such that the worm wheel 105 is coaxial with a crank shaft member 111 of the crank shaft 110. In addition, an output rod 120 is fixed to a crank pin 112 of the crank shaft 110. Accordingly, rotational motion of the crank shaft 110 is converted to reciprocating motion of the output rod 120 (in terms of the paper of FIG. 10, motion from the inward direction to the outward direction). Moreover, a clutch position detection sensor S3 is provided at an end of the crank shaft member 111 of the crank shaft 110. Other locations are possible. The clutch position detection sensor S3 detects the rotation angle of the crank shaft 110 (in the embodiment, the crank shaft member 111). The rotation angle of the crank shaft 110 is used to detect the stroke of the output rod 120, which is then used as basis for detecting the clutch position of the clutch mechanism 44. The clutch position detection sensor S3 corresponds to a rotation angle sensor of one embodiment of the invention.

Figure 11:
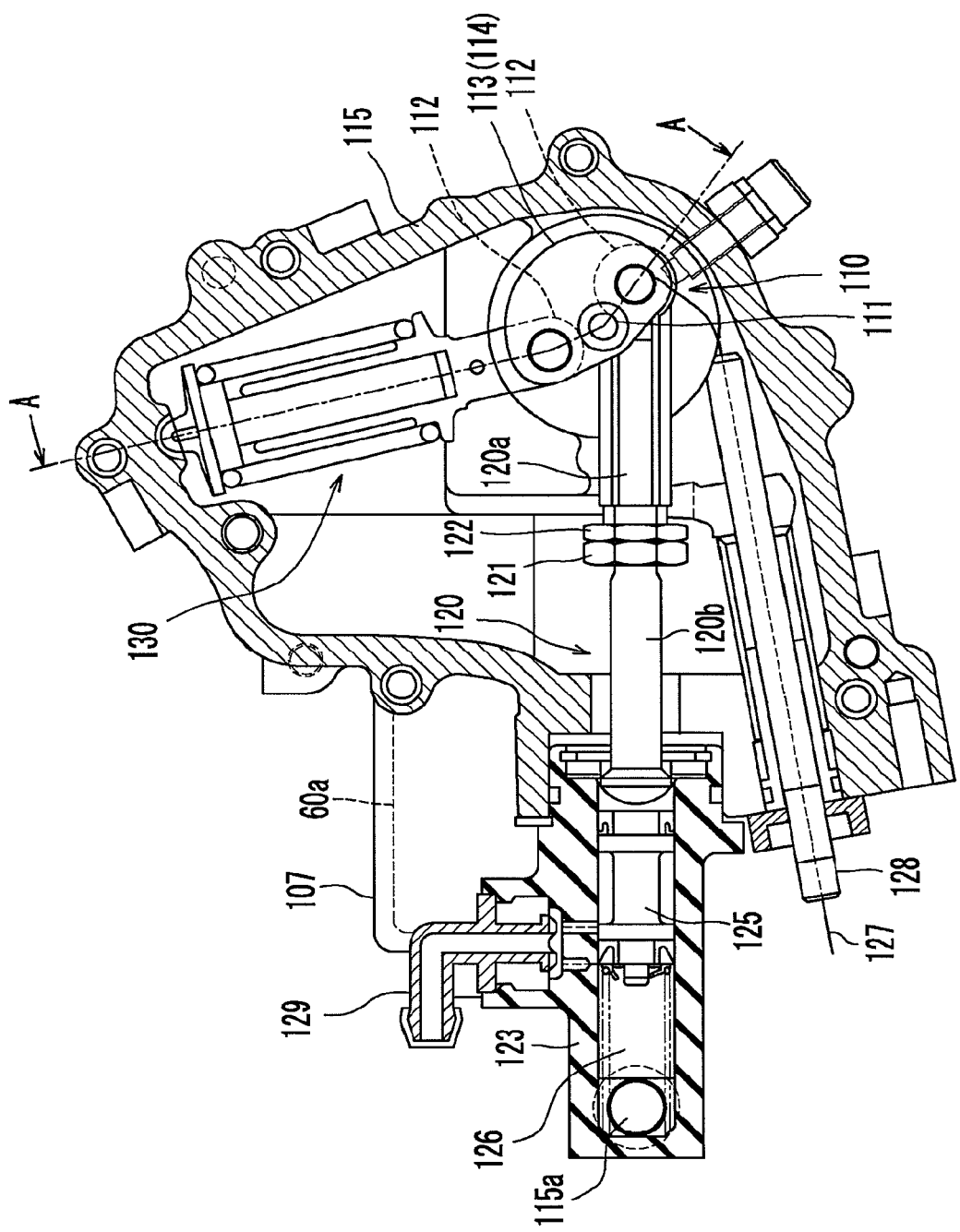
FIG. 11 is a side view of the clutch actuator.
Figure 12:
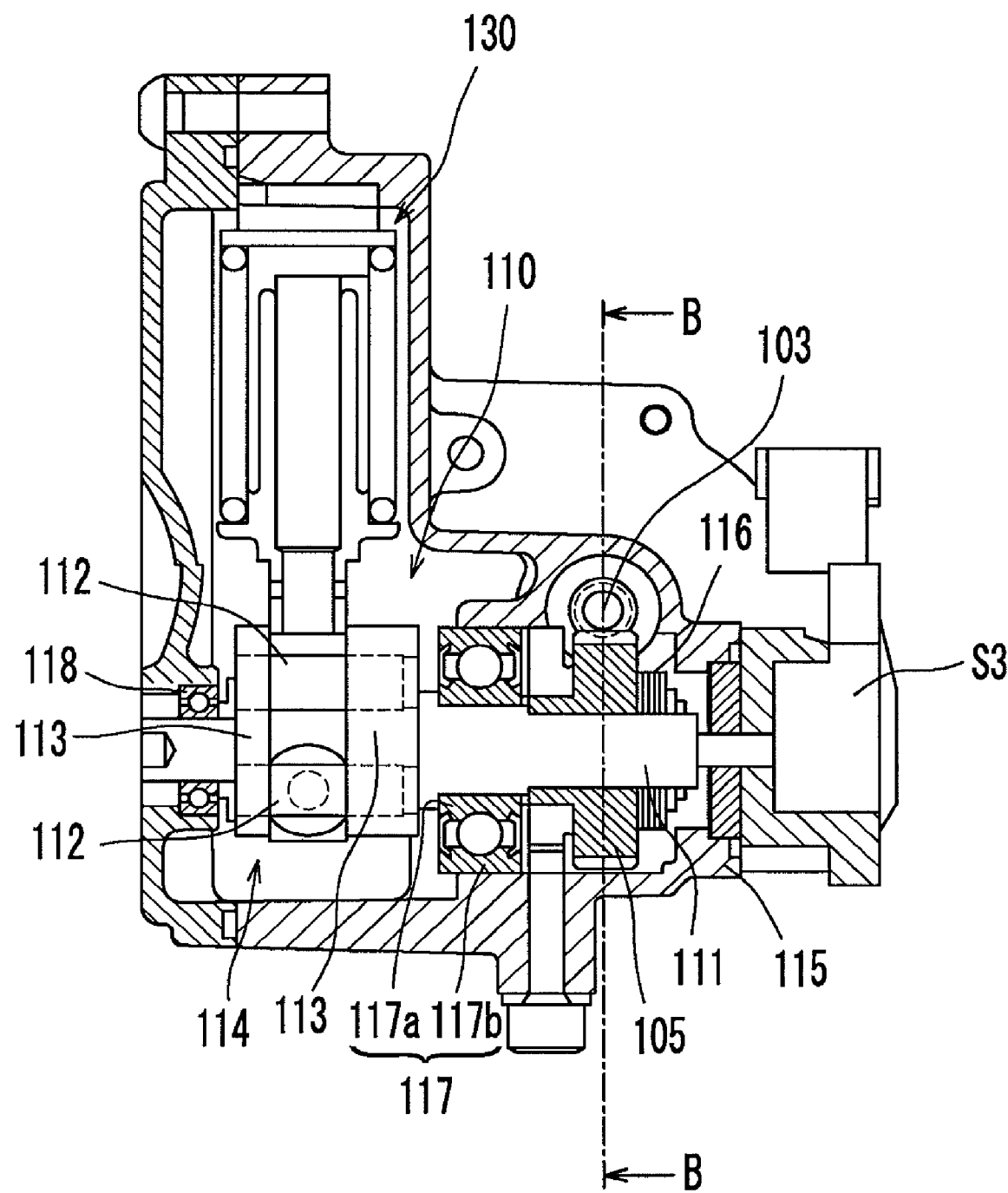
FIG. 12 is a sectioned view taken along line A-A of FIG. 11.
Figure 13:
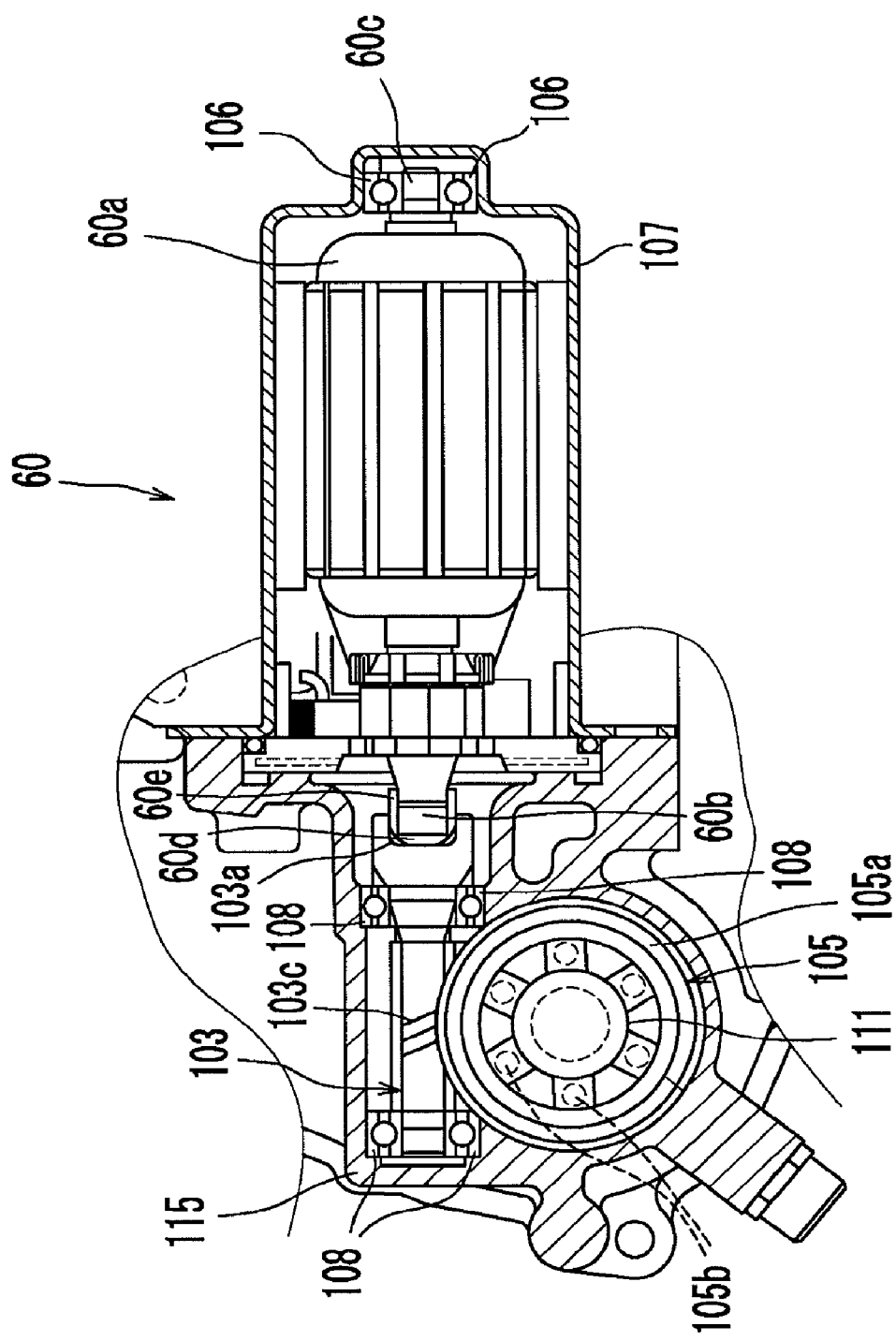
FIG. 13 is a sectioned view taken along line B-B of FIG. 11.

FIG. 11 is a cross sectional view of the clutch actuator 60. FIG. 12 is a cross sectional view along line A-A of FIG. 11, and FIG. 13 is a cross sectional view along line B-B of FIG. 12. Referring to FIG. 13, the clutch motor 60a is provided with a motor shaft 60b. The motor shaft 60b is disposed to pass through the center of the clutch motor 60a. A rear side end (the right side end in the figure) 60c of the motor shaft 60b is supported by a motor bearing 106. An outer ring of the motor bearing 106 is fixed to a motor case 107 that houses the clutch motor 60a. In the illustrated configuration, the motor bearing 106 is a ball bearing.

A front side end 60d (i.e., the left side end in the figure) of the motor shaft 60b is formed with a plurality of splines 60e. The front side end 60d is inserted and fitted within a spline hole 103a formed in the worm shaft 103, whereby the motor shaft 60b and the worm shaft 103 are spline fitted together.

Figure 14:
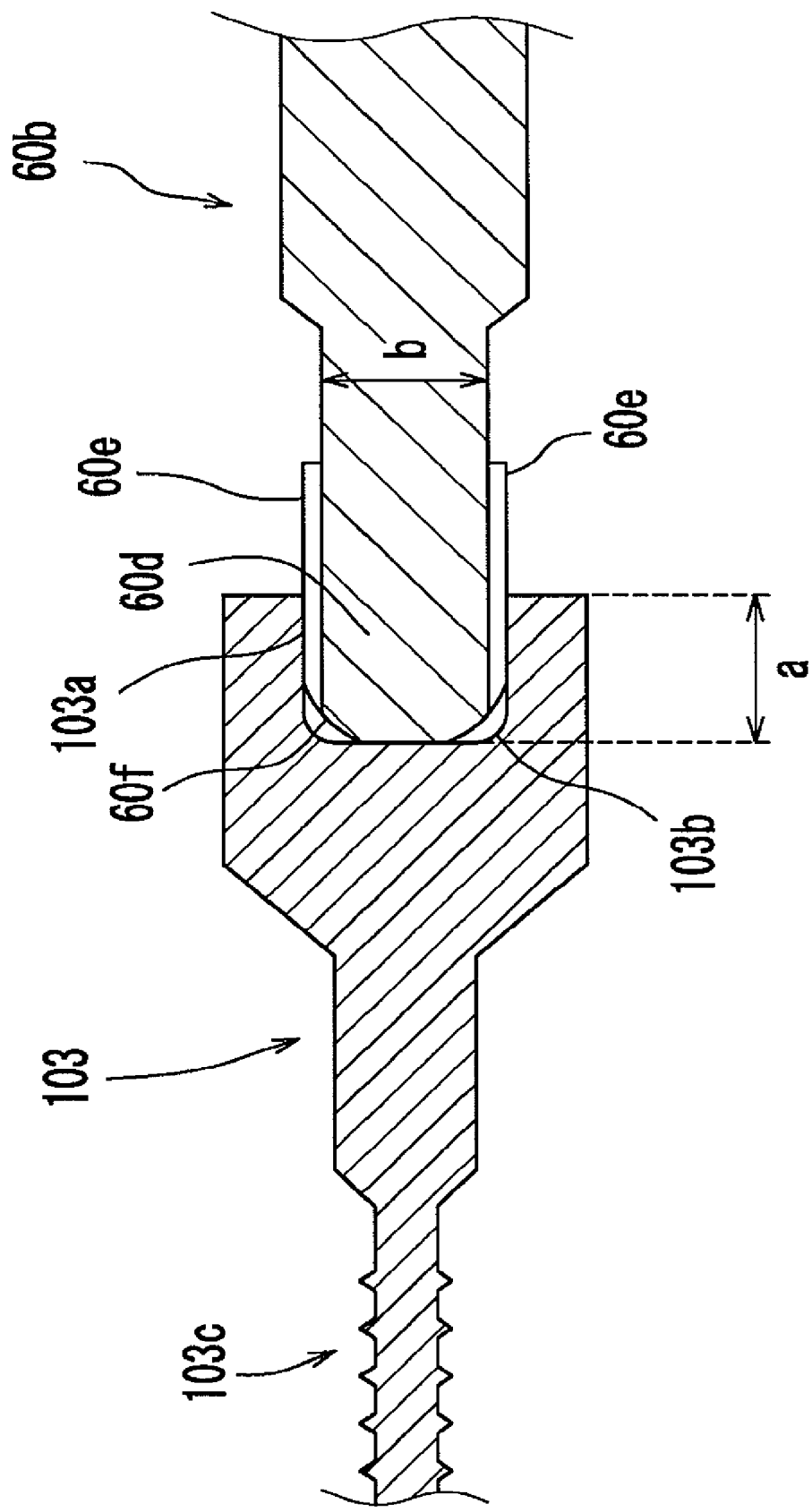
FIG. 14 is an enlarged cross sectional view of a coupling portion of a motor shaft and a worm shaft.

FIG. 14 is an enlarged cross sectional view of the fitting portion of the motor shaft 60b and the worm shaft 103. Referring to FIG. 14, the plurality of spline teeth 60e are formed in the front side end 60d of the motor shaft 60b. In addition, a spline groove that engages with the spline teeth 60e is formed in the spline hole 103a of the worm shaft 103. Further, the front side end 60d of the motor shaft 60b is inserted and fitted in the spline hole 103a of the worm shaft 103, whereby the members are spline fitted together.

In addition, the front side end 60d of the motor shaft 60b is chamfered to form a rounded section 60f. The round section 60f is formed to spread across an area further to the shaft center side of the motor shaft 60b than the bottom of the spline teeth 60e. As a result of chamfering the front side end 60d of the motor shaft 60b in this way, even if the shaft center of the motor shaft 60b oscillates during rotation of the clutch motor 60a, this can be absorbed at the worm shaft 103 side. Accordingly, transmission of oscillation to the worm shaft 103 can be greatly reduced or inhibited. Further, in one configuration, the bottom of the spline hole 103a of the worm shaft 103 is also chamfered to form a rounded section 103b.

Moreover, a depth "a" of the spline hole 103a of the worm shaft 103 is smaller than a diameter "b" of the front side end 60d of the motor shaft 60b. In other words, a<b. As a result of making the section of the motor shaft 60b fitted into the worm shaft 103 shorter in this way, oscillation of the shaft center of the motor shaft 60b during rotation thereof can be favorably absorbed at the worm shaft 103 side.

Referring to FIG. 13, a threaded section 103c (also refer to FIG. 14) is formed in the worm shaft 103. Further, the worm shaft 103 is supported by bearings 108 that are respectively disposed at the front side (the left side in the figure) and the rear side (the right side in the figure) of the threaded section 103c. In one configuration, the two bearings 108 are both ball bearings. The outer rings of the bearings 108 can be fixed to a housing 115 of the clutch actuator 60. In this manner, the front and rear of the threaded section 103c can be supported by the bearings 108, whereby shaft oscillation of the worm shaft 103 during rotation is inhibited or greatly reduced, and rotation of the worm shaft 103 is stabilized.

Figure 15:
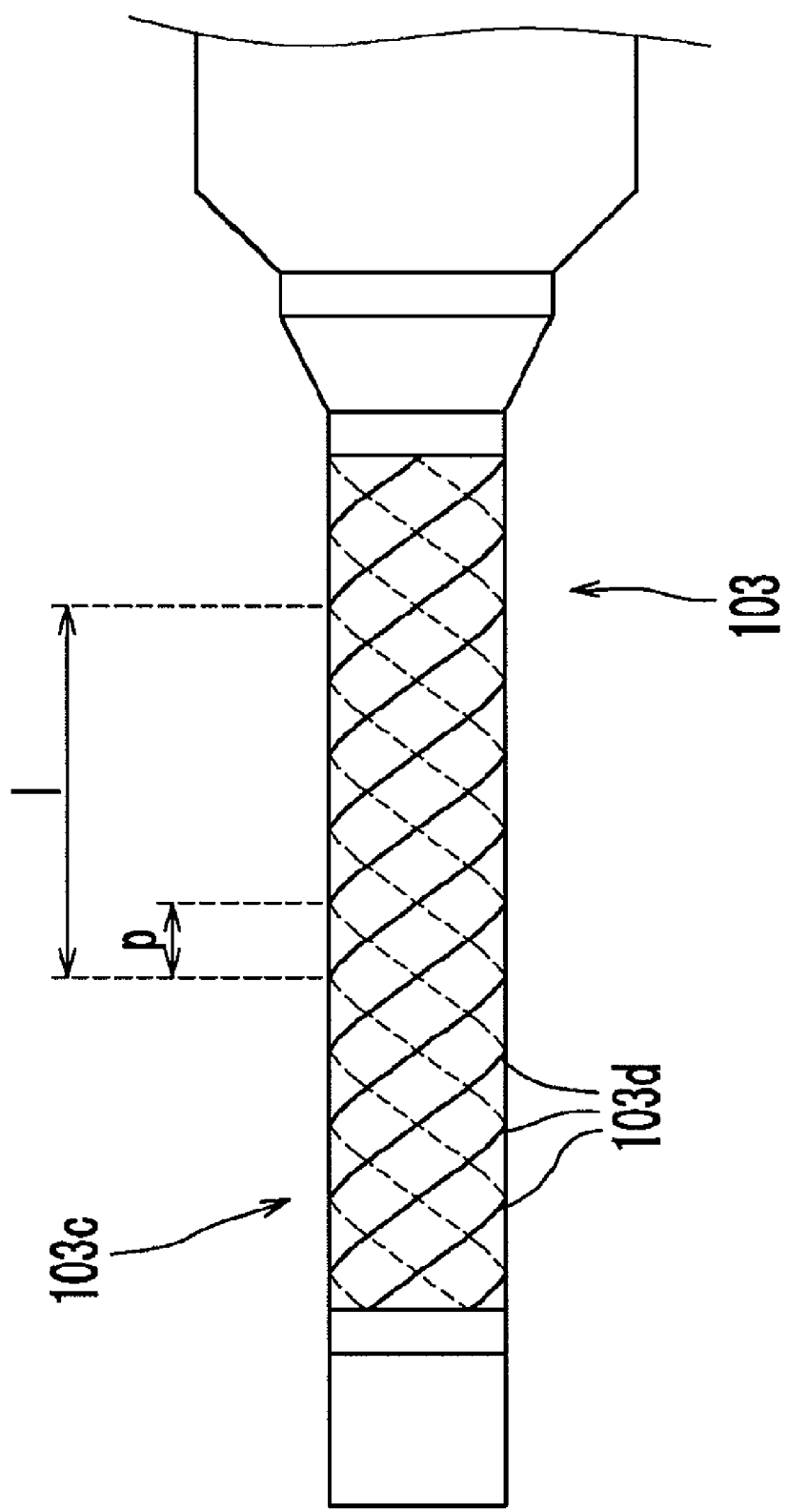
FIG. 15 is an enlarged view of a portion of the worm shaft in which a threaded section is formed.

FIG. 15 is an enlarged view of the section of the worm shaft 103 in which the threaded section 103c is formed. Referring to FIG. 15, the threaded section 103c of the worm shaft 103 is formed with a plurality of threads 103d. Note that, FIG. 15 is intended to explain the number of threads of the threaded section 103c, but does not necessarily provide an accurate illustration of the shape of the threads 103d formed in the periphery surface of the thread section 103c. Any suitable thread design can be used.

In one configuration, the distance moved in the axial direction when the worm shaft 103 rotates once will be taken to be lead l, the distance between adjacent threads 103d will be taken to be pitch p, and the number of threads in the threaded section 103c will be taken to be n. Given this, the relationship l=n□p is established. As is apparent from FIG. 15, in this embodiment, the number of threads n of the threaded section 103c is 4. By setting the number of threads of the threaded section 103c formed in the worm shaft 103 to be 2 or more (multiple) in this way, it is possible to make the lead angle of the worm wheel 105 larger. Accordingly, the reduction gear ratio of the worm gear (the reduction gear ratio between the worm shaft 103 and the worm wheel 105) can be set smaller, thereby allowing the responsiveness of the output rod 120 to be improved. As a result, responsiveness of the disengagement-engagement operation of the clutch mechanism 44 can be improved. Further, the transmission efficiency of multiple threads is better than that of a single thread, and thus the reciprocating motion of the output rod 120 (refer to FIG. 10 and FIG. 11) rapidly follows the rotational motion of the clutch motor 60a. In other words, the rotational motion of the clutch motor 60a can be efficiently converted to reciprocating movement of the output rod 120 and output loss of the clutch motor 60a can be reduced. As a result, the responsiveness of the clutch disengagement-engagement operation can be improved.

Referring to FIG. 13, the threaded section 103c of the worm shaft 103 meshes with gear teeth 105a of the worm wheel 105. The worm wheel 105 preferably has a substantially ring-like shape, with the gear teeth 105a formed in the periphery surface thereof. Torque limiters 105b are provided in a shaft center section of the worm wheel 105. The torque limiters 105b may be provided with a transmission plate (not shown), which is spline fitted to the crank shaft member 111 of the crank shaft 110 (refer to FIG. 12) and which rotates along with the crank shaft member 111, and an inner clutch (not shown) that is provided at the external edge of the transmission plate. When the driving force applied to the worm wheel 105 becomes equal to or greater than a predetermined value, the transmission plate and the inner clutch slip with respect to each other, thereby preventing excessive driving force from being transmitted to the crank shaft member 111. In some embodiments, the torque limiters 105b may be omitted and the worm wheel 105 may be integrally fixed to the crank shaft 110.

Referring to FIG. 12, the worm wheel 105 is fixed to an end of the crank shaft member 111 of the crank shaft 110 (the right side end in FIG. 12). The worm wheel 105 is fixed to the crank shaft member 111 such that the worm wheel 105 is coaxial with the crank shaft member 111 and is parallel with a crank arm 114 of the crank shaft 110. A side surface of the worm wheel 105 is perpendicular with respect to the crank shaft member 111. The crank arm 114 is defined with a pair of arm sections 113 that are positioned to face each other, and a crank pin 112 that is coupled to the pair of arm sections 113. Further, the crank shaft member 111 extends from substantially the center of the arm sections 113 toward the side (i.e., in the left-right direction of FIG. 12).

The crank shaft member 111 of the crank shaft 110 is rotatably fixed at both ends of the housing 115. In addition, a Belleville spring 116 is interposed between the worm wheel 105 and the housing 115 on the crank shaft member 111.

The crank shaft member 111 is supported by a pair of bearings 117, 118. The outer rings of these two bearings 117, 118 are both fixed to the housing 115. In one configuration, the pair of bearings 117, 118 are both ball bearings. Of the two bearings, the bearing 117 is closer to the worm wheel 105, and is disposed between the worm wheel 105 and the right-side arm section 113. The bearing 117 preferably is a double sealed bearing that has seals on both the side of an inner ring 117a and an outer ring 117b. Bearing grease is enclosed in the inside of the bearing 117. Grease (e.g., molybdenum grease) is used between the above described worm shaft 103 and the worm wheel 105. However, this grease can potentially have a detrimental impact on the bearing 117 that is adjacent to the worm wheel 105. More specifically, if the above grease were to adhere to the inside of the bearing 117, it is possible that performance of the bearing 117 would be impaired. Thus, in one embodiment, a double sealed bearing is used as the bearing 117 and the bearing grease is substantially enclosed within the bearing. As a result, the grease used between the worm shaft 103 and the worm wheel 105 is less likely to enter into the bearing 117 and have a detrimental impact.

Further, the bearing 118 can be disposed to the left side of the left-side arm section 113. Accordingly, the crank arm 114 can be interposed between the bearing 117 and the bearing 118. By positioning the crank arm 114 between the two bearings 117, 118, it is possible to stabilize rotation of the crank shaft member 111. In one configuration, the above described bearing 117 corresponds to a first bearing, and the bearing 118 corresponds to a second bearing.

Moreover, the bearing 117 disposed in the vicinity of the worm wheel 105 preferably is a larger ball bearing than the bearing 118 that is disposed at a position away from the worm wheel 105. The bearing 117 disposed closer to the worm wheel 105 is subjected to a comparatively large force acting in the radial direction. However, if a large ball bearing is used for the bearing 117, the crank shaft member 111 can be supported more stably. Accordingly, it is favorable if a large ball bearing is used in this manner. On the other hand, the bearing 118 disposed at the position away from the worm wheel 105 is subjected to a comparatively small force acting in the radial direction. Accordingly, it is possible to use a smaller bearing (has a smaller diameter) relative to the bearing 117.

Further, the right side end of the crank shaft member 111 of the crank shaft 110 can be provided with the clutch position detection sensor S3 (refer to FIG. 10). The clutch position detection sensor S3 detects the rotation angle of the worm wheel 105, and uses it to detect the stroke of the output rod 120, which is used as a basis for detecting the clutch position of the clutch mechanism 44. Other arrangements and/or proxies also can be used.

Referring to FIG. 11, the illustrated output rod 120 is fixed to the crank pin 112 at the lower side of the illustrated crank shaft 110. The illustrated output rod 120 includes a base 120*a* formed with a tapped hole and a rod 120*b* formed with a threaded section. The threaded section of the rod 120*b* can be screwed into the tapped hole of the base. 120*a*. In addition, a lock nut 121 and a nut 122 can be tightened onto the threaded section of the rod 120*b*. A section of the lower side crank pin 112 to which the output rod 120 is fixed, as shown in FIG. 12, preferably overlaps with the crank shaft member 111 in the diameter direction. More specifically, when the crank shaft member 111 is viewed from the outside in the axial direction (i.e., the right side in FIG. 12), a section of the crank pin 112 overlaps with the crank shaft member 111. As a result of the overlap with the crank shaft member 111, the attachment radius of the output rod 120 (i.e., the distance from the center of the crank shaft member 111 to the point where the output rod 120 is attached) can be reduced. As a result, the rotation angle of the worm wheel 105 that is required to move the output rod 120 the same stroke can be increased. Accordingly, the worm wheel 105 can be made smaller, and responsiveness can be improved. Further, size reduction of the worm wheel 105 can also be achieved.

The illustrated configuration allows adjustment of the length of the output rod 120. More specifically, the rod 120*b* can be rotated with respect to the base 120*a* in order to change the length of the output rod 120. After the length has been changed, the lock nut 121 and the nut 122 can be tightened on the base 120*a* side, thereby fixing the position of the output rod 120.

A tip of the output rod 120 can be provided with, or connected to, a piston 125. The piston 125 can slide in the axial direction of the output rod 120 within a cylinder 123 (i.e., in the left-right direction in the figure). In the illustrated configuration, a left side section of the piston 125 in the cylinder 123 defines an oil chamber 126 that is filled with hydraulic oil or the like. The oil chamber 126 can be connected with a reservoir (not shown) via a tank connecting member 129. Other configurations, including integrated reservoirs, also can be used.

In addition, one end of an assist spring 130 can be secured to the crank pin 112 at the upper side of the crank arm 114, or the crank shaft 110. The other end of the assist spring 130 preferably is secured to the housing 115 in any suitable manner. The assist spring 130 assists rotation of the crank shaft member 111 of the crank shaft 110, thereby assisting the stroke of the output rod 120.

In the illustrated embodiment, as shown in FIG. 11, the assist spring 130 advantageously is attached to the crank arm 112. Accordingly, the assist spring 130 and the crank arm 114 are substantially positioned in a single plane. Arranging and positioning the assist spring 130 in this manner makes it possible to shorten the axial direction length of the clutch actuator 60 and thus reduce the size of the clutch actuator 60.

When the clutch mechanism 44 (refer to FIG. 7) is to be switched from an engaged state to a disengaged state, the clutch motor 60*a* is driven, thereby causing the coupled worm shaft 103 to rotate. Rotation of the worm shaft 103 is transmitted to the worm wheel 105 that is meshed with the worm shaft 103, and the worm wheel 105 rotates. When the worm wheel 105 rotates, the crank shaft member 111 of the crank shaft 110 also rotates. Then, the rotational motion of the worm wheel 105 is converted to linear motion of the output rod 120 by the crank shaft 110, and the output rod 120 moves in the leftward direction of FIG. 11.

The output rod 120 that moves linearly in the leftward direction of FIG. 11 pushes the piston 125, thereby generating hydraulic pressure in the oil chamber 126. The generated hydraulic pressure is transmitted to the piston 463 (refer to FIG. 7) from a hydraulic fluid outlet 115*a* formed in the housing 115 via an oil hose (not shown) or the like. Then, the hydraulic pressure drives the push rods 461, 455 (refer to FIG. 7) to disengage the clutch. Advantageously, the linear motion of the output rod 120 is assisted by the assist spring 130.

With this embodiment, it is possible to automatically disengage the clutch mechanism 44 by driving the clutch motor 60*a*, and also to manually disengage the clutch mechanism 44. Referring to FIG. 11, a guide tube 128 for a clutch wire 127 is provided at the lower side of the output rod 120 in the housing 115. One end of the clutch wire 127 is fixed to the lower side crank pin 112. As a result of the guide tube 128, the clutch wire 127 is positioned to run in a direction that extends leftwards and downwards in the figure. When a clutch lever, or the like, (not shown) is manually operated, the clutch wire 127 is pulled in the longitudinal direction of the guide tube 128 (i.e., the leftward-downward direction in FIG. 11), thereby rotating the crank shaft 110 and moving the output rod 120 in the leftward direction of FIG. 11.

As shown in FIG. 11, the clutch motor 60*a*, which is connected to the worm shaft 103, and the output rod 120, which is fixed to the crank pin 112, extend in substantially the same direction. However, in order to position the clutch motor 60*a* and the output rod 120 such that there is little or no interference therebetween, the clutch motor 60*a* and the output rod 120 have been positioned apart from each other to a certain extent. In the illustrated embodiment, as shown in FIG. 12, the worm wheel 105 is fixed to the end of the crank shaft member 111 of the crank shaft 110 separately from the crank arm 114. Further, the worm wheel 105 is disposed to be generally parallel to the crank arm 114 and generally coaxial with the crank shaft member 111. As a result, even if the clutch motor 60*a*, which is disposed close to the worm wheel 105, and the output rod 120, which is fixed to the crank pin 112, are positioned so that they do not substantially interfere with each other, the length of the crank shaft member 111 can be shortened. As a result, size and the weight increase of the crank shaft 110 are limited, and any size and weight increase of the clutch actuator 60 itself is also limited.

Figure 16:
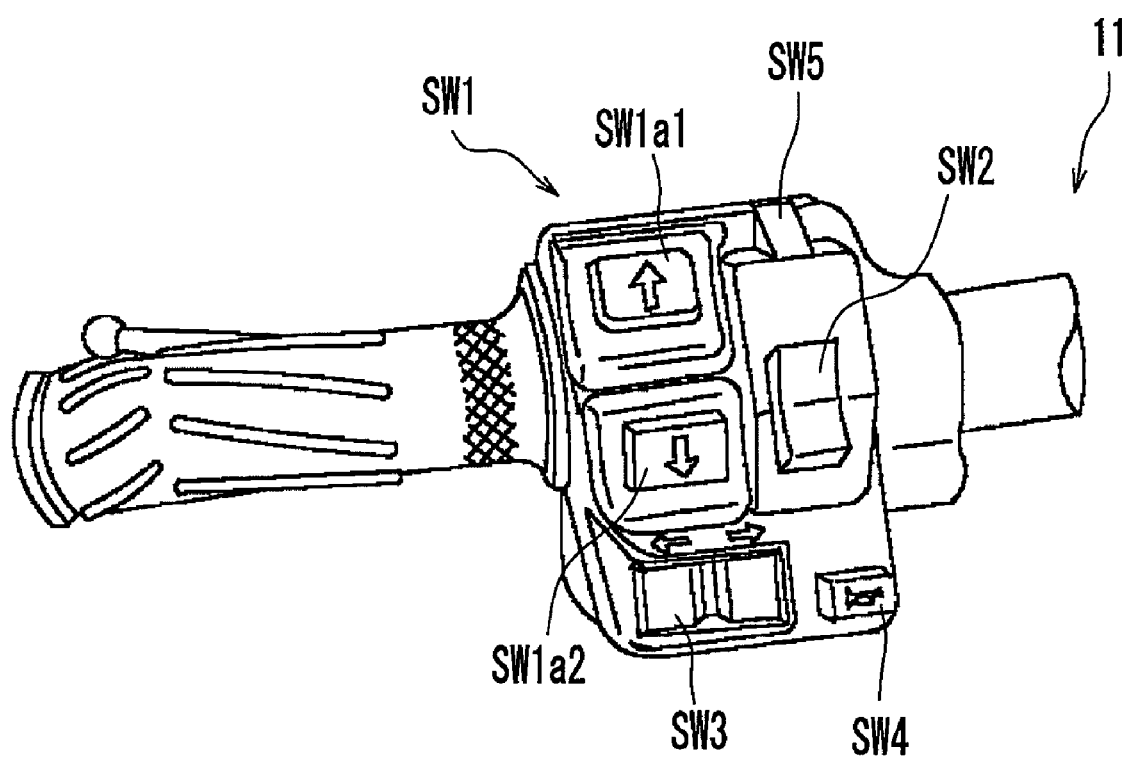
FIG. 16 is a perspective view of a switch section of a handle grip.
Figure 17:
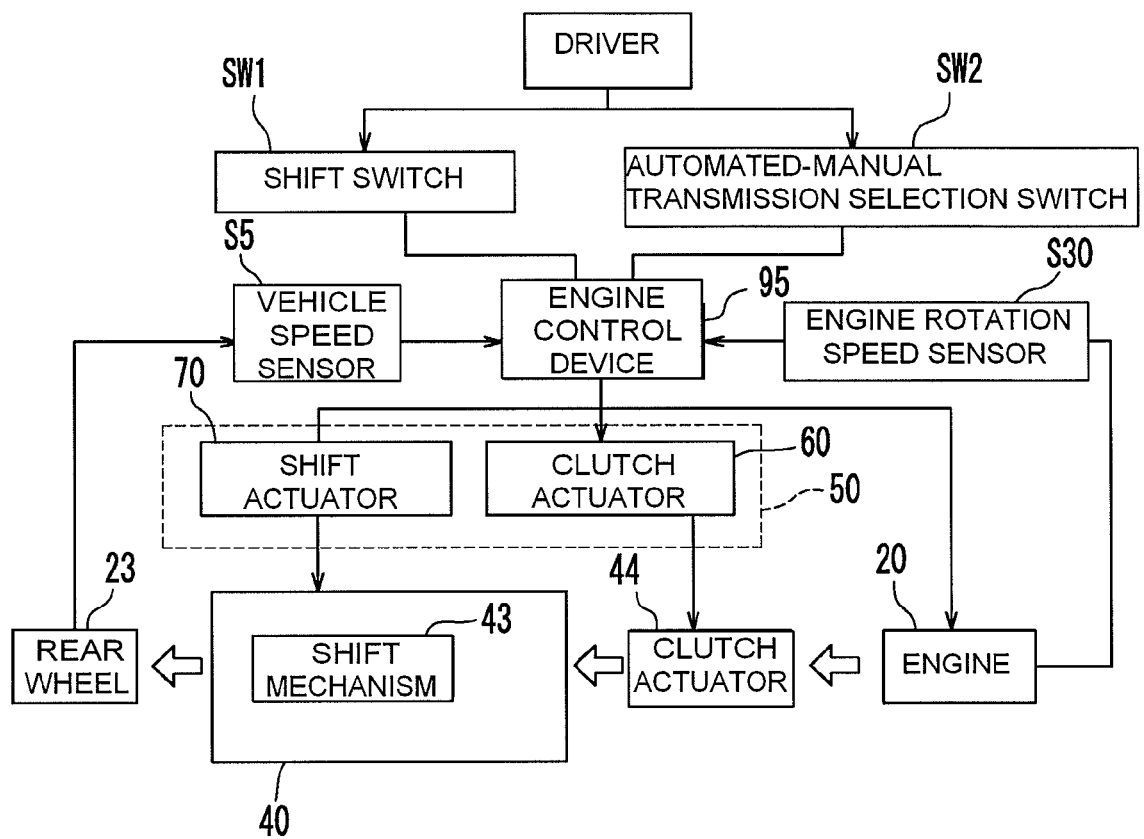
FIG. 17 illustrates a control system used with one embodiment of the automated transmission control device.

With reference now to FIG. 16 and FIG. 17, one configuration of the automated transmission control device will be explained in more detail. As shown in FIG. 16, a shift switch SW1, for example, can be provided on a grip on the left side of the steering handlebar 11. The shift switch SW1 can comprise an up-shift switch SW1*a*1 and a down-shift switch SW1*a*2. The rider can operate the shift switch SW1 as necessary or desired to upshift and/or downshift through the gears between a first gear speed and a fastest speed gear (for example, a sixth gear speed). Further, a selection switch SW2, an indicator switch SW3, a horn switch SW4 and a light switch SW5 also can be provided on the left grip. Other configurations are possible. In the illustrated configuration the selection switch SW2 can be used to select whether the gear shift operation is performed using a semi-automatic mode or a fully-automatic mode.

Referring to FIG. 17, switching of the shift mechanism 43 and the clutch mechanism 44 preferably are both performed by the automated transmission control device 50. Further, the motorcycle 1 can be provided with, in addition to the shift position detection device S2 (refer to FIG. 6) of the shift actuator 70, the clutch position detection device S3 (refer to FIG. 10) of the clutch actuator 60, the engine rotation speed sensor S30, and a vehicle speed sensor S5, etc.

In one preferred configuration, the engine control device 95 controls operation of the clutch actuator 60 and the shift actuator 70 based on data detected by the various sensors and with information provided by the shift switch SW1. More specifically, predetermined programs can be pre-stored in the engine control device 95. In addition to the programs, other operating circuits also can be used to automatically perform a series of shift operations including disengaging the clutch mechanism 44, switching the gears of the transmission 40, and reengaging the clutch mechanism 44.

As described above, the bearing 117 can be provided between the worm wheel 105 and the crank arm 114. As a result, the size of the crank shaft member 111 can be reduced (e.g., smaller diameter), thereby allowing the attachment radius of the output rod 120 to be made smaller. Because the attachment radius of the output rod 120 is smaller, the rotation angle that the crank shaft member 111 rotates in order to move the output rod 120 the same stroke increases. Accordingly, the rotation angle of the worm wheel 105 can be increased. As a result, the diameter of the worm wheel 105 can be reduced, which makes it possible to reduce the size and weight of the clutch actuator 60. Further, because the diameter of the worm wheel 105 is reduced, the reduction gear ratio between the worm shaft 103 and the worm wheel 105 can be reduced, thereby allowing the movement of the output rod 120 to rapidly follow the rotation of the clutch motor 60a, which improves the responsiveness of the clutch disengagement-engagement operation.

In one embodiment, the worm wheel 105 is fixed to the end of the crank shaft member 111 of the crank shaft 110 separately from the crank arm 114. The worm wheel 105 also is positioned generally parallel to the crank arm 114 and generally coaxial with the crank shaft member 111. In addition, the assist spring 130 preferably is attached to the crank arm 114 rather than to the crank shaft member 111. As a result, when the clutch motor 60a, which is disposed close to the worm wheel 105, and the output rod 120, which preferably is fixed to the crank arm 114, are positioned to reduce the likelihood of interfering with each other, it is possible to shorten the length of the crank shaft member 111. As a result, size and the weight increase of the crank shaft 110 can be limited, and the size and weight increase of the clutch actuator 60 itself can also be limited.

In one embodiment, the bearings 117, 118 are respectively positioned at each side of the crank arm 114. Accordingly, rotation of the crank shaft 110 can be stabilized, thereby allowing the operation of the output rod 120 to be stabilized and the disengagement-engagement operation of the clutch mechanism 44 to be stabilized.

As shown in FIG. 12, in one embodiment, the bearing 117 supports one end of the crank shaft member 111 in a cantilever-like manner. In other words, the right end of the crank shaft member 111 is only supported by the bearing 117 positioned at the left side and no bearing for supporting the crank shaft member 111 is provided further to the right from the bearing 117. In addition, the worm wheel 105 can be attached at the end of the crank shaft member 111 that is cantilevered in this manner. However, the bearing 117 can be disposed between the worm wheel 105 and the crank arm 114 with the bearing 117 being positioned close to the worm wheel 105. Thus, even though the worm wheel 105 is attached to the cantilever-supported section of the crank shaft member 111, strength-related problems are less likely to arise. Thus, in the illustrated embodiment, the number of bearings can be reduced and the size of the actuator 60 can be reduced.

In one embodiment, a section of the lower side crank pin 112 to which the output rod 120 is fixed overlaps in the diameter direction with the crank shaft member 111. More specifically, when the crank shaft member 111 is viewed from the outside in the axial direction (i.e., the right side in FIG. 12), a section of the crank pin 112 overlaps with the crank shaft member 111. As a result of this overlapping positioning of the crank pin 112 and the crank shaft member 111, the attachment radius of the output rod 120 can be reduced. Thus, the rotation angle of the worm wheel 105 required to move the output rod 120 the same stroke can be increased. Accordingly, the worm wheel 105 can be made smaller and responsiveness can be improved. Further, the worm wheel 105 can also be reduced in size.

In one embodiment, the assist spring 130 can be attached to the crank arm 114 with the assist spring 130 and the crank arm 114 being positioned in substantially the same plane. As a result, the axial direction length (i.e., the left-right direction of FIG. 12) of the clutch actuator 60 can be shortened, and the size of the clutch actuator 60 can be reduced.

Also, with the bearing 118 disposed at a position away from the worm wheel 105 being a smaller bearing (i.e., having a smaller diameter) relative to the bearing 117, the size of the actuator 60 can be reduced. On the other hand, the bearing 117 can be a comparatively large ball bearing. Accordingly, the force generated by the worm wheel 105 that acts in the radial direction can be better supported. Thus, even though the crank shaft member 111 is made thinner, strength related problems are less likely to occur. The above feature also allows size and weight increases of the actuator 60 to be limited.

In one embodiment, the clutch actuator 60 can be provided with a rotation angle sensor (e.g., the clutch position detection sensor S3) for detecting the rotation angle of the crank shaft 110. As described previously, the rotation angle of the worm wheel 105 can be increased, which allows the rotation angle of the crank shaft 110 (which is coupled to the worm wheel 105) to be increased. Thus, when the rotation angle of the crank shaft 110 is detected by the rotation angle sensor, resolution can be increased, which allows detection accuracy to be improved.

In some embodiments, it is sufficient that the rotation angle sensor can, as a final result, detect the rotation angle of the crank shaft 110. In other words, proxies for the rotation angle of the crank shaft 110 also can be used. Thus the rotation angle sensor is not restricted to directly detecting a section (for example, the crank shaft member 111 or the crank arm 113) or the whole of the crank shaft 110. The rotation angle sensor may detect a rotation angle of another member that rotates along with the crank shaft 110 (for example, the worm wheel 105), in order to indirectly detect the rotation angle of the crank shaft 110.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A clutch actuator comprising:
a motor comprising a motor shaft, the motor shaft being rotatable about a first axis;
a worm shaft comprising a threaded section, the worm shaft being rotatable about a second axis, the first axis being coaxial to the second axis;
a worm wheel meshing with the threaded section of the worm shaft;
a crank shaft comprising a crank shaft member that rotates with rotation of the worm wheel, the crank shaft also comprising a crank arm that is provided on the crank shaft member at a distance apart from the worm wheel;
an output rod being attached to the crank arm, the output rod being adapted to convert rotational motion of the worm wheel transmitted via the crank shaft to reciprocating motion, the output rod further being adapted to disengage and engage a clutch;
a first bearing that supports the crank shaft member of the crank shaft being positioned between the worm wheel and the crank arm; and
a housing accommodating at least the crank arm and the first bearing.

2. The clutch actuator according to claim 1, wherein the worm wheel is fixed to the crank shaft member of the crank shaft such that the worm wheel and the crank shaft member rotate about a single axis and such that the worm wheel is generally parallel with the crank arm.

3. The clutch actuator according to claim 1, wherein
the crank arm comprises a pair of arm sections positioned to face each other with a crank pin coupling together the arm sections,
the output rod being attached to the crank pin, and
when viewed from an axial direction of the crank shaft member of the crank shaft, a section of the crank pin overlaps with the crank shaft member.

4. The clutch actuator according to claim 1 further comprising an assist spring that is attached to the crank arm, the assist spring adapted to assist rotation of the crank shaft by extending and contracting in a direction that intersects with the crank shaft member of the crank shaft.

5. The clutch actuator according to claim 1, further comprising a rotation angle sensor that detects a rotation angle of the crank shaft.

6. The clutch actuator according to claim 5, wherein the rotation angle sensor directly detects the rotation angle of the crank shaft.

7. An engine unit comprising:
an engine;
a clutch that connects and disconnects a drive line to driving force of the engine; and
the clutch actuator of claim 1.

8. A saddle type vehicle comprising the engine unit of claim 7.

9. The clutch actuator according to claim 1, wherein the housing also accommodates the worm wheel.

10. The clutch actuator according to claim 9, wherein the housing also accommodates the crank shaft.

11. A clutch actuator comprising:
a motor comprising a motor shaft, the motor shaft being rotatable about a first axis;
a worm shaft comprising a threaded section, the worm shaft being rotatable about a second axis, the first axis being coaxial to the second axis;
a worm wheel meshing with the threaded section of the worm shaft;
a crank shaft comprising a crank shaft member that rotates with rotation of the worm wheel, the crank shaft also comprising a crank arm that is provided on the crank shaft member at a distance apart from the worm wheel;
an output rod being attached to the crank arm, the output rod being adapted to convert rotational motion of the worm wheel transmitted via the crank shaft to reciprocating motion, the output rod further being adapted to disengage and engage a clutch;
a first bearing that supports the crank shaft member of the crank shaft being positioned between the worm wheel and the crank arm; and
a second bearing that supports the crank shaft, the second bearing being disposed such that the crank arm is positioned between the first bearing and the second bearing.

12. The clutch actuator according to claim 11, wherein the first bearing and the second bearing comprise ball bearings.

13. The clutch actuator according to claim 11, wherein the second bearing has a smaller diameter than the first bearing.

14. A clutch actuator comprising:
a motor comprising a motor shaft, the motor shaft being rotatable about a first axis;
a worm shaft comprising a threaded section, the worm shaft being rotatable about a second axis, the first axis being coaxial to the second axis;
a worm wheel meshing with the threaded section of the worm shaft;
a crank shaft comprising a crank shaft member that rotates with rotation of the worm wheel, the crank shaft also comprising a crank arm that is provided on the crank shaft member at a distance apart from the worm wheel;
an output rod being attached to the crank arm, the output rod being adapted to convert rotational motion of the worm wheel transmitted via the crank shaft to reciprocating motion, the output rod further being adapted to disengage and engage a clutch;
a first bearing that supports the crank shaft member of the crank shaft being positioned between the worm wheel and the crank arm; and
a housing accommodating at least the crank shaft arm and the first bearing, wherein one end of the crank shaft member of the crank shaft is supported by the first bearing in a cantilever manner and the worm wheel is attached to the one end of the crank shaft member that is cantilevered.

* * * * *

UNITED STATES PATENT AND TRADEMARK OFFICE
CERTIFICATE OF CORRECTION

| | | |
|---|---|---|
| PATENT NO. | : 7,635,054 B2 | Page 1 of 1 |
| APPLICATION NO. | : 11/469310 | |
| DATED | : December 22, 2009 | |
| INVENTOR(S) | : Kosugi et al. | |

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 338 days.

Page 1; Col. 2, Item 56; Line 14; Under Foreign Patent Documents, change "433645" to --4336445--.

Column 13, Line 14, change "base." to --base--.

Signed and Sealed this

Third Day of August, 2010

David J. Kappos
*Director of the United States Patent and Trademark Office*